United States Patent [19]

Engelberger et al.

[11] 4,086,522
[45] Apr. 25, 1978

[54] COMPUTER ASSISTED TEACHING ARRANGEMENT FOR CONVEYOR LINE OPERATION

[75] Inventors: Joseph F. Engelberger; Maurice J. Dunne, both of Newtown; William Perzley, Weston, all of Conn.

[73] Assignee: Unimation, Inc., Danbury, Conn.

[21] Appl. No.: 721,805

[22] Filed: Sep. 8, 1976

[51] Int. Cl.² .............................................. B25J 9/00
[52] U.S. Cl. .................................. 318/568; 364/478; 364/117; 364/118; 29/430; 29/701; 219/80; 18/341
[58] Field of Search .......................... 219/80; 318/568; 29/430; 235/151.11, 151.1; 214/1 BB; 198/340

[56] References Cited

U.S. PATENT DOCUMENTS

| Re. 28,437 | 6/1975 | Devol et al. ............................ 198/34 |
| 3,259,254 | 7/1966 | Mitchell ............................ 214/1 BD |
| 3,744,032 | 7/1973 | Engelberger et al. ............ 340/172.5 |
| 3,818,290 | 6/1974 | Harper et al. ....................... 18/340 X |
| 3,943,343 | 3/1976 | Irie et al. ............................ 235/151.11 |
| 3,958,682 | 5/1976 | Martin ................................ 214/1 BB |
| 4,011,437 | 3/1977 | Hohn ................................ 235/151.11 |

*Primary Examiner*—Eugene G. Botz
*Attorney, Agent, or Firm*—Mason, Kolehmainen, Rathburn & Wyss

[57] ABSTRACT

A programmable manipulator having an arm which is movable in a plurality of axes and encoder apparatus for the axes operative to develop position signals corresponding to the actual position of the arm is provided adjacent a workpiece moving along a predetermined path, a conveyor for example, to perform a series of programmed operations on the workpiece.

The programmable manipulator is provided with teach-programming apparatus for moving the arm during an initial teaching operation to different positions of the stationary workpiece corresponding to the desired series of operations of the manipulator relative to the stationary workpiece. Further, apparatus is provided for calculating digital representations during the teaching operation representing the positions of the arm accounting for the projected workpiece movement during playback and corresponding to the initial teaching positions relative to the workpiece. The calculated digital representations are than stored for use in controlling movement of the arm during playback with a moving workpiece.

The manipulator control electronics is provided with an interpolation unit which is effective to maintain the manipulator in synchronism with the moving conveyor during playback. This interpolation unit achieves substantially constant velocity dividing the recorded conveyor position signals for successive steps into a predetermined number of increments and utilizing the interpolated increments as artificial command signals.

A velocity mode constant may also be calculated and recorded during the teach mode and utilized in playback to generate velocity command signals to control the manipulator.

92 Claims, 12 Drawing Figures

COMPUTER ASSISTED TEACHING ARRANGEMENT FOR CONVEYOR LINE OPERATION

CROSS-REFERENCE TO RELATED APPLICATIONS

The present application is related to copending application Ser. No. 625,932 filed by J. F. Engelberger, et al. on Oct. 28, 1975 which discloses a programmable manipulator apparatus and is hereby incorporated by reference for all purposes.

BACKGROUND OF THE INVENTION

A. Field of the Invention

The present invention relates to programmed manipulator apparatus and more particularly to an arrangement whereby the programmed manipulator base may remain fixed and the manipulator arm moved through a series of programmed steps in coordination with a continuously moving workpiece. The programmed recorded data is calculated from statically-taught positions with the conveyor stopped wherein a series of steps over a portion of the workpiece are taught. While the invention is particularly suitable for and will be described in connection with the welding of car bodies, or the like, it will be understood that the arrangement of the present invention is equally suitable for performing other types of operations on a continuously moving workpiece.

B. Description of the Prior Art

Programmed manipulators of the type shown, for example in Dunne, et al. U.S. Pat. No. 3,661,051, have been employed in the past to perform various types of operations on conveyor carried workpieces. Thus, in Devol U.S. Pat. No. 3,283,918 an arrangement is shown wherein the programmed manipulator is bodily moved on rails parallel to a continuously moving conveyor and in timed relation with the workpiece so that there is no relative movement between the programmed manipulator and the workpiece during the working cycle. While this arrangement is generally suitable for its intended purpose, it has the disadvantage that the bodily movable programmed manipulator requires a considerable amount of floor space which must be considered off limits for human operators and hence a large amount of space is required to perform the required welding operations on a given car body, or the like. In addition, the entire programmed manipulator must be moved along the rails and because of the weight of the manipulator, the services that must be provided such as welding cables, air hoses, and the like, and the length of movement of the manipulator along these rails, the equipment necessary to move the manipulator along these rails is the most expensive of any of the motions of the programmed manipulator. Furthermore, installation of a rail system to carry one or more programmed manipulators along a given conveyor line is costly and disruptive of production during installation, servicing and the like.

Another arrangement which has been heretofore used in connection with the welding of car bodies on an automobile assembly line is to employ a so-called indexing or start-stop conveyor line in which the car bodies are sequentially moved to different stations opposite a group of fixedly positioned programmed manipulators and the conveyor is held stationary while a given welding operation is performed on a given car body at each station. Such an arrangement has the disadvantage that the indexing conveyor moves considerably slower than a continuously moving conveyor since the car bodies must be stopped at each station during the entire welding operation performed by a programmed manipulator. In addition, the complexity of the conveyor drive system necessary to stop the conveyor accurately at each programmed manipulator station considerably increases the cost of the overall conveyor system required. Furthermore, and most importantly, when an indexing conveyor system is employed, it is not practical to mix human operators in with programmed manipulators on a given conveyor line because the human operators will always have to be protected with safety buttons and then the entire conveyor line will move only as fast as the slowest operator on the line.

Engelberger, et al. U.S. Pat. No. 3,744,032 discloses another conveyor arrangement whereby the stationary based manipulator may be programmed by successively stopping the workpiece at different closely spaced locations along the conveyor path, successively moving the manipulator arm to positions corresponding to the different points on a representative workpiece when the workpiece is positioned at the different locations, and recording the corresponding position to which the arm is successively moved. While this arrangement is also generally suitable for its intended purpose, it has the disadvantage that the conveyor must be moved precisely a small amount such as ½ to 1 inch every time a point is recorded. Movement of the entire conveyor line by such a small increment is almost impossible to accomplish with any degree of accuracy. Accordingly, the particular car body to be programmed or reprogrammed is usually unhitched from the main conveyor line and either programmed at a separate location or at the same location while the main conveyor line remains down. Such a recording procedure is costly and time consuming despite the fact that the procedure only approximates the effects of conveyor movement.

SUMMARY OF THE INVENTION

It is, therefore, a principal object of the present invention to provide a new and improved programmed manipulator arrangement which may be employed with a continuously moving conveyor and wherein one or more of the above described disadvantages of the prior art arrangements are eliminated.

It is another object of the present invention to provide a new and improved stationary base programmed manipulator arrangement wherein the manipulator arm is initially programmed in a teach-assist mode over an extended portion of the workpiece involving a number of steps or operations with the conveyor line in a stationary position and the manipulator is programmed to perform a series of operations on the workpiece carried by a continuously moving conveyor.

It is a further object of the present invention to provide a new and improved programmed manipulator apparatus which computes and records positional data synchronized to the line conveyor from the statically taught points for the manipulator arm, this computation taking into account conveyor line motion during playback. The computed and recorded positional data is then utilized during playback to perform a series of predetermined operations on the workpiece carried by a continuously moving conveyor.

It is another object of the present invention to provide a new and improved stationary base programmed manipulator apparatus wherein a series of points or positions of the manipulator arm over a portion of the workpiece are statically taught, new positional data is computed and recorded taking into account the projected movement of the conveyor during playback, the conveyor is advanced to approximately the last recorded-calculated position, and another series of points are statically taught; the process being repeated until the entire operation on the workpiece to be performed by a specific manipulator is programmed whereupon the recorded program is sequentially advanced to control the manipulator arm in synchronism with the moving conveyor to perform the taught series of steps on the continuously moving workpiece.

It is a further object of the present invention to provide a new and improved programmed manipulator apparatus for use with a continuously moving conveyor arranged to carry substantially identical workpieces past the manipulator that includes program apparatus for developing a series of command signals corresponding to different positions of the manipulator arm computed from statically taught points and corresponding to desired new positions of the arm, the control apparatus being responsive to the calculated command signals to move the manipulator arm so that it describes a predetermined work path in relation to a moving workpiece on the conveyor such that the predetermined work path may correspond to the statically taught points relative to the workpiece.

It is another object of the present invention to provide a new and improved fixed base manipulator apparatus which can perform programmed operations which are different from but calculated from statically taught positions on a workpiece carried by a continuously moving conveyor and wherein compensation is provided for variation in the speed of the conveyor.

It is a further object of the present invention to provide a new and improved manipulator apparatus which generates effective artificial positional command signals and a velocity command signal derived from the recorded data that is calculated from statically taught points; the artificial command signals being utilized to move the manipulator arm at a substantially constant programmed velocity and being generated in a manner synchronized to the position of the continuously moving conveyor.

It is still another object to provide a new and improved manipulator apparatus for use with a moving conveyor wherein a variable duration interpolation period unit is utilized to produce a series of effective artificial interpolation command signals of a predetermined number between successive stored program positional command signals; the artificial command signals are effective to control movement of the manipulator arm and are generated in a predetermined variable spaced relationship according to the positions of the continuously moving conveyor.

It is still a further object of the present invention to provide a new and improved programmable manipulator arrangement for use with a workpiece carried by a moving conveyor wherein accurate recorded positional command signals are calculated over an extended portion of a workpiece from statically taught positions with a stopped conveyor, and the recorded command signals are utilized in a repeat or playback mode to perform a series of operations such as welding operations on the continuously moving workpiece.

It is yet another object of the present invention to provide a new and improved programmable manipulator arrangement for use with a workpiece carried by a moving conveyor wherein accurate recorded positional command signals and fixed velocity command signals are calculated over an extended portion of the workpiece for selected points with the conveyor in a stationary position and the recorded signals are utilized in a replay mode to open loop command a fixed velocity which is adjusted for conveyor line speed variation and to close loop control positional location relative to the workpiece.

It is a further object of the present invention to provide a new and improved manipulator apparatus for use in conjuction with a moving conveyor wherein closed loop velocity command signals are provided within an overall closed positional loop; the velocity command signals are generated for the various controlled axes from recorded positional data and a recorded velocity mode constant and are compared with velocity feedback signals from the axes.

BRIEF DESCRIPTION OF THE DRAWINGS

The invention, both as to its organization and method of operation, together with further objects and advantages thereof, will best be understood by reference to the following specification taken in connection with the accompanying drawings in which:

FIG. 4 is a diagrammatic perspective representation of the manipulator of FIG. 2 employed in describing the teachassist facilities of the present invention;

DETAILED DESCRIPTION OF THE PREFERED EMBODIMENT

Figure 1:
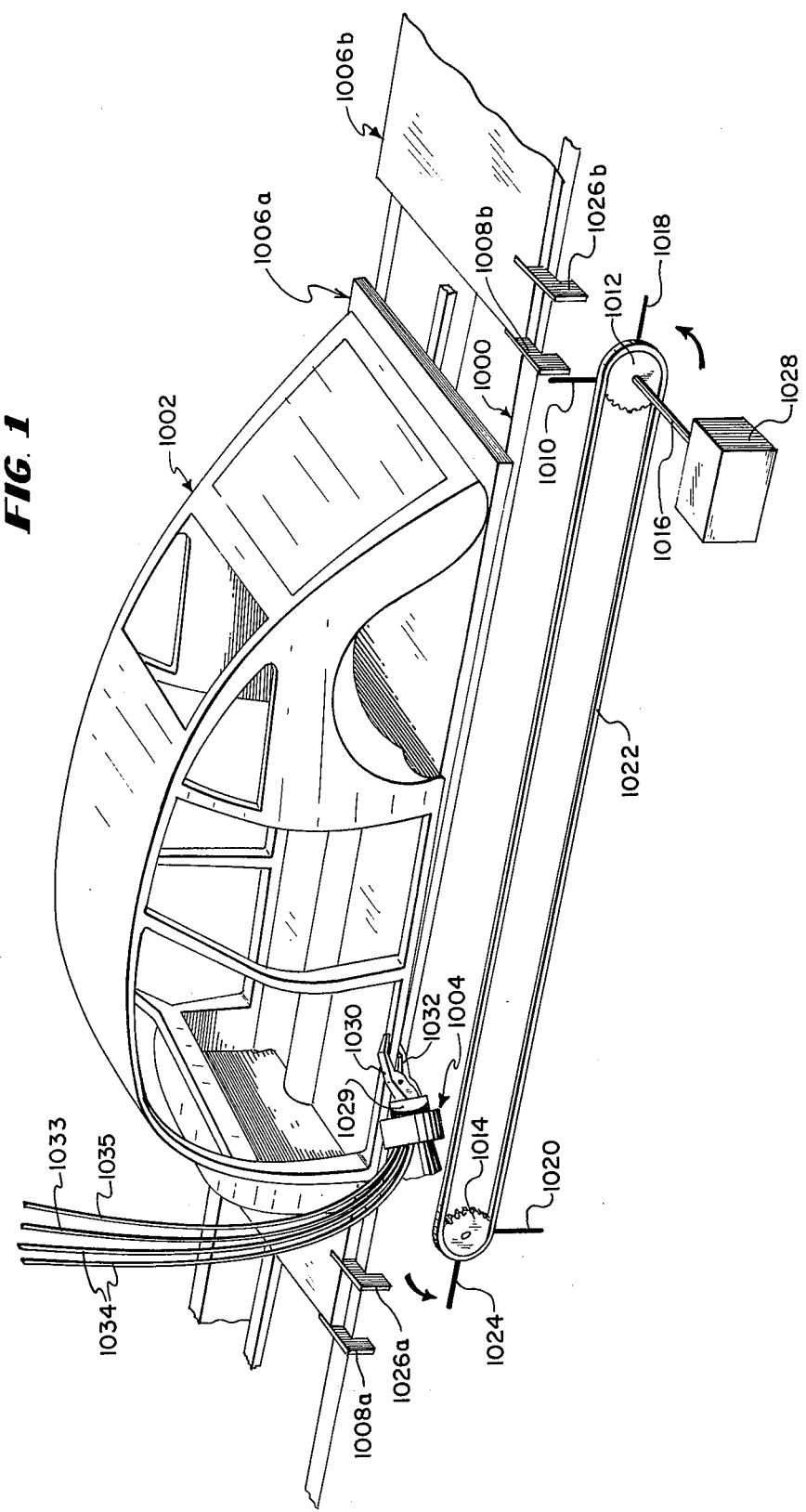
FIG. 1 is a perspective view of a portion of the stationary based programmed manipulator arrangement of the present invention shown in conjunction with a continuously moving conveyor line in connection with which the programmed manipulator is arranged to perform a series of spot welding operations on car bodies located on the moving conveyor.

Referring now to the drawings and more particularly to FIGS. 1 to 9, inclusive, the programmable manipulator system of the present invention is therein illustrated in conjunction with a conveyor line indicated generally at 1000 which carries a series of car bodies, one of which is indicated generally as 1002, past a series of fixed base programmable manipulators, the movable arm of one of these manipulators being indicated generally at 1004. The programmable manipulators 1004 are preferable of the type shown and described in detail in copending Engelberger, et al. application Ser. No. 625,932 filed Oct. 28, 1975 and reference may be had to said copending application for a detailed description of such a programmable manipulator, said detailed description being hereby incorporated herein by reference. Many of the control circuits and electronic circuits of the manipulators 1004 are similar to that described in U.S. Pat. No. 3,661,051 issued to M. J. Dunne, et al. on May 9, 1972 to which reference may also be made for a more detailed description and is hereby incorporated by reference.

The car bodies 1002 may be individually supported on carriers 1006 forming a part of the continuously moving conveyor 1000, each of the carriers 1006 being provided with a first reference tab or indicator arm 1008 which extends outwardly beyond the side of the conveyor 1000. The car body 1002 is accurately positioned relative to its carrier 1006 by any suitable registration arrangement, and, as the carrier 1006 is moved along the conveyor line, a first indicator arm 1008 engages the end of a control or reference lever 1010 which is carried by a chain 1022 disposed alongside the conveyor 1000. The chain 1022 is supported and travels around sprocket wheels 1012 and 1014 with wheel 1012 located at the conveyor point that is first encountered by the carriage 1006. The chain and sprocket wheel arrangement provides an exact pitch chain drive for conveyor line tracking.

When the indicator arm 1008 engages the lever 1010, the chain 1022 is driven or follows conveyor movement, and sprocket wheels 1012 and 1014 are rotated. The sprocket 1012 is connected through a shaft 1016 to drive an encoder device indicated generally at 1028. The encoder device 1028 may be similar to the encoders employed for the various controlled axes of the programmed manipulator 1004, as described in detail in the above-identified copending Engelberger, et al. application Ser. No. 625,932, these encoders being arranged to provide a continuously changing digital output signal representing the absolute position of the arm 1008 and carriage 1006 as they are moved in synchronism with the conveyor 1000. The encoder 1028 is arranged to produce a zero or starting reference digital signal when the arm 1010 is engaged by lever 1008 and, as the arm 1010 and lever 1008 are moved along the conveyor line 1000 with the car body 1002, the conveyor encoder 1028 produces a digital output signal which accurately represents the position of the car body relative to the sprocket arrangement.

In accordance with the present invention, this digital encoder output signal is employed to control movement of the manipulator arm 1004 of the previously programmed manipulator so that this arm follows a predetermined work path over a particular area of the car body at which the manipulator has been programmed to produce a series of spot welding operations although it should be noted that other work operations such as assembly might also be performed. More particularly, the manipulator 1004 is provided with a weld gun 1029, having a pair of welding electrodes 1030 and 1032, which is mounted on the end of the manipulator arm 1004 for rotation about the wrist swivel axis of the manipulator as described, for example, in U.S. Pat. No. 3,654,616 which issued to M. J. Dunne, et al. on Apr. 4, 1972.

While reference may be had to the above-referenced patent for a detailed description, it may be generally stated that the welding electrode 1032 may be movable under the control of a pneumatically operated cylinder the actuation of which is controlled by the application of air pressure to input and output conduits 1033 and 1035 by means of suitable flexible overhead air hoses, as will be readily understood by those skilled in the art. When the piston of the actuating cylinder is moved forwardly, the electrodes 1030 and 1032 clamp a particular part of the frame of the car body 1002 between these welding jaws and an electrical spot welding operation can be performed by means of electrical power supplied through the overhead cables 1034.

When the car body 1002 has been moved past the manipulator arm station and the desired series of spot welding operations has been performed by this manipulator, it is necessary to align the chain 1022 so that a conveyor synchronizing signal may be produced by the encoder to control movement of the manipulator arm 1004 when the next car body approaches this station and the indicator arm 1008 thereof engages the reference lever 1010. To this end, a first reset lever 1018 is provided along chain 1022 located one-quarter of the sprocket wheel circumference behind reference lever 1010. A second, symmetrical, arrangement is provided at the opposite end of the chain 1022, sprocket wheel 1014 position in FIG. 1, with a second reference lever 1020 carried by the chain 1022 at exactly one-half the chain length apart from the first reference lever 1010. Similarly, a second reset lever 1024 is located one-half the chain length apart from reset lever 1018 and one-quarter of a turn behind second reference lever 1020. In conjunction with the reset function and levers 1020 and 1024, a second indicator arm 1026 is provided on each carriage 1006 spaced behind the first indicator arm 1008 whereupon arm 1026a engages reset arm 1024 after the first reference lever 1020 is disengaged by the first indicator arm 1008a of the advanced carriage 1006a. The engagement of reset arm 1024 advances the chain 1022 sufficiently, three-eighths revolution of the sprocket wheel, positioning the second reference lever 1010 to be engaged by the first indicator arm 1008b on the next successive carriage 1006b. The reset operation results in a total positional adjustment or loss of one-half revolution of the sprocket wheels in the overall conveyor encoder following procedure. With a total chain lengthof 32 feet overall in a specific conveyor embodiment, the encoded length is 16 feet or one-half the total chain length minus the one-half turn of the sprocket wheel. Assuming a one foot circumference of the sprocket wheels 1012 and 1014, the total maximum encoder range is 15.5 feet. The sprocket wheels 1012 and 1014 are accordingly designed with four teeth per inch so that the sprocket chain 1022 includes 1536 sprocket slots.

Thus, the sprocket wheel 1012 and encoder 1028 traverse 16 turns for one encoded conveyor period. The encoder 1028 is designed to provide approximately $2^{13}$ numerical bits for the total conveyor movement measured resulting in each bit representing conveyor movement of approximately 0.0234 inches, for example, which is adequate to permit precise positional data and control of the conveyor. Accordingly, the encoder drive sprockets and the gear ratios should be such that the input shaft 1016 of the encoder 1028 is driven at the correct angle to move the encoder through its full range in response to the maximum travel of the indicator levers 1008 and 1026 along the conveyor 1000. At a nominal conveyor line speed of six inches per second, for example, the time to traverse one basic unit of length or displacement unit, approximately 0.0234 inches, between successive numerical output bits equals approximately 3.9 milliseconds. It should be understood, however, that the line speed is arbitrary and that nominal line speeds in the range of 3–6 inches/second and maximum line speeds of 10–12 inches/second are contemplated with manipulator tip velocities of 15 to 20 inches/second.

The basic conveyor encoder displacement unit is utilized as a reference to synchronize the programmable manipulator system so that the interval of time between successive output pulses is a variable dependent upon the exact line speed and short term variations. It should be noted that other combinations of output pulses could be assigned to be one basic unit of length such as 10 pulses of 0.39 milliseconds spacing each to represent a basic unit length of 0.0234 inches corresponding to a basic unit time interval of 3.9 milliseconds at a nominal line speed of six inches per second.

In accordance with the present invention, the manipulator may be initially programmed in a teach-assist mode so as to permit the manipulator arm of the fixed base manipulator 1004 to perform the desired series of spot welding operations on the car body 1002 moving with the conveyor 1000. Thus, the manipulator 1004 is initially taught or programmed by teaching and recording the manipulator positions at appropriate intervals along the car body 1002 thereby performing the entire operation of weld positions. The teach programming is accomplished by recording a series of connected operations over a portion of the car body, e.g. approximately one foot, unless collision problems are encountered, with the conveyor stopped and the car body in a stationary position. The teach operator may indicate the desired contact or weld points on the workpiece over the teach area by means of chalk marks, paste-on labels or other suitable indicating marks to simplify the movement of the arm over the desired series of operations or work cycle. Appropriate color coding or other distinguishing characteristics may be utilized to denote different functions to be performed by the manipulator apparatus at different points on the workpiece. The manipulator electronics, as will be explained in detail hereinafter, calculates the appropriate new positional signals for the six controlled axes of the arm and the coordinated projected conveyor positions that are required to synchronize the taught positions with the conveyor when continuously moving. The calculations are accomplished from the static manipulator taught positions and static conveyor position. The computed or calculated points represent the same positions relative to the car body with a moving conveyor as the statically taught points and are recorded into memory for use during replay in the operating mode. The calculations take into account the projected movement of the conveyor relative to the statically taught positions of the manipulator arm during playback.

After the calculated points over the selected teach range of approximately one foot are recorded into memory, the operator is ready to move the manipulator to a new teach area of operation on the car body whereupon the manipulator controls read out the projected conveyor position calculated from the last statically taught position on a TTY print out or suitable display. The operator then either manually or with automatic conveyor controls advances the conveyor a suitable distance such as approximately to the displayed position or somewhat farther, such as to the midpoint of the next teach area on the work piece. The advancement of the conveyor with automatic controls in one specific embodiment utilizes electronics to advance the conveyor until an approximate equality is achieved between the conveyor encoder and recorded positional change or to advance the conveyor to a point of predetermined distance beyond the last projected conveyor position. The electronics may also provide for movement of the manipulator arm to the last recorded position calculated from the last statically taught point.

Accordingly, the teaching and programming of a workpiece may be accomplished directly on the conveyor line during the downtime or off-hours of the line such as lunch hours and after normal hours without interrupting normal manufacturing. This teach programming without "breaking-up" the line or unhitching a workpiece is possible since the conveyor line is only approximately advanced by a foot or so between the taught series of points. This advancement is practical on a manufacturing conveyor line with the necessary precision unlike other teaching methods where precise ½ or 1 inch advancements of the conveyor for every recorded point would be required.

Alternatively, the teach-programming may be accomplished on a simulated conveyor line with a workpiece from the normal conveyor manufacturing line. In this way, teach programming for the various programmable manipulator locations and conveyor lines may be performed at anytime and without the cost of adapting the normal conveyor lines to be controlled and advanced by the manipulator teach controls.

In any case, the operator is now ready to statically teach another one foot portion of the car body with the conveyor line stopped wherein the manipulator electronics calculates and records the positional signals, as described above, corresponding to the same relative position on the car body with the conveyor moving. This procedure is repeated until all operations or steps have been taught on the car body or until the car body is midway between successive programmable manipulator work areas with the conveyor being periodically advanced manually or by the computer between successive teaching positions. The conveyor is advanced to approximately the midpoint of each new teaching range of one foot or so. The teaching and recording is performed on sections of about one foot for reasons such as computational accuracies and working distance of the arm and in many applications due to the problems in foreseeablity of collision problems from obstructions such as doors, window frames, etc. Theoretically, if the arm movement range or reach is long enough and the workpiece presents no obstruction problem such as in the case of a flat surface area, the teach programming could be accomplished over a wide area of the workpiece with the conveyor in a stationary location. The calculations from statically taught points that represent movement of the manipulator arm relative to the car body are calculated at a projected arm velocity of twelve inches per second although it should be understood that any velocity greater than the maximum conveyor line velocity is also suitable.

Thus, movement of the arm is assured relative to the car body in a direction advancing ahead of or keeping pace with the conveyor. Further, the arm is capable of being programmed to move in a direction reverse to that of the advancing conveyor direction wherein the arm will move at the maximum speed of twelve inches per second over an appropriate time interval, come to a stop while waiting for the appropriate contact point on the car body and move into contact at the conveyor line speed such as to perform a weld as will be explained in detail hereinafter. The various speed parameters and movement techniques of the apparatus contribute greatly to efficiencies in time and space.

When calculated points for all the statically taught points on the car body have been recorded, the conveyor 1000 is arranged to be driven at a continuous speed, six inches per second, for example. As the conveyor encoder 1028 is driven by the conveyor 1000, it produces a digital output signal for each basic displacement unit traversed by the conveyor representing movement of the car body past the manipulator station whereupon the recorded program steps in memory are sequentially selected under the control of the digital output signals so that the manipulator arm performs the taught steps or welds at the same relative points on the car body as taught.

When a spot weld is to be made on the car body 1002, the electrodes 1030, 1032, clamp a particular area of the car body and hence the end effector of the manipulator arm 1004 is engaged with the continuously moving car body 1002 for an appreciable amount of time. If the conveyor 1000 is moving at a speed of six inches per second, and the welding jaws 1030, 1032 are closed for approximately three-tenths of a second, then the manipulator arm 1004 will be rigidly connected to the moving car body for approximately 1.8 inches, i.e., while the car body is moving several inches.

During the teach-assist programming of the manipulator 1004, as will be explained in more detail hereinafter, the manipulator arm is programmed to move in a direction of the conveyor travel at the conveyor speed during periods when a weld is being made and the electrodes 1030, 1032 are in engagement with the moving car body. For this mode of programming, it is assumed that the synchronized movement of the manipulator arm relative to the moving car body is sufficiently precise that the electrodes may be clamped to a particular point on the car body and the spot weld made without appreciable relative movement between the weld electrodes and the car body for the duration of the weld. It will be understood that if relative movement occurs between the electrodes 1030, 1032, and the car body while these electrodes are clamped to the car body, the spot weld would be imperfectly made, and the relatively thin car body could buckle or bend, since the actuators moving the manipulator arm are relatively powerful.

Accordingly, while it is contemplated that the programming discussed hereinabove is sufficiently accurate to permit conventional drive of the manipulator arm during periods of contact of the welding electrodes with the moving car body, it is also possible to provide for a small manipulator hand or end effector compliance to absorb any error due to resultant inaccuracies.

In the teach-assist mode of programming or recording of taught positions, a conventional computer or similar calculating apparatus performs the calculations necessary to translate static taught positions to moving conveyor positions. This computer may also determine that the range of static recorded positions is of insufficient accuracy in accordance with a procedure that will be explained in detail hereinafter. Thus, the computer, when the operator attempts to record another static position, may signal a low accuracy indication and print out or display an encoder conveyor position corresponding to the last calculated recorded point past which the conveyor should be advanced. The operator will then advance the conveyor to this approximate position manually or automatically and begin to record the next desired point until the series of operations in that area are completed or until the computer again indicates that the conveyor should be advanced due to computational accuracy problems and/or collision possibilities.

On playback in several modes of operation the selection of the successively taught program steps is not controlled by the predetermined accuracy between the encoders of the various controlled axes of the manipulator and their respective command signals from memory as in the point-to-point (PTP) mode. Instead, in these modes, the continuous path (CP) and the point-to-point controlled PTP (C) modes, the successive program steps are selected by the comparison of the output of the conveyor encoder 1028 with the conveyor command signal calculated and recorded during teaching. Accordingly, the memory of the manipulator is continuously stepped to successive program steps under the control of digital signals from the conveyor encoder 1028. The location of the spot welds on the car body 1002 may be made with the desired accuracy if the speed at which the manipulator arm moves between recorded points is sufficiently greater than the speed of the moving conveyor to ensure proper positioning of the arm before the occurrence of conveyor encoder coincidence. An example of this type of conveyor coincidence is described in more detail in U.S. Pat. No. 3,744,032 referred to above.

In accordance with an important aspect of the present invention, the manipulator control electronics is provided with a variable duration interpolation period unit which is effective to maintain the manipulator in synchronism with the conveyor and to achieve substantially constant velocity between programmed steps by dividing the recorded conveyor positional signals and recorded command signals for the six controlled axes on a multiplex basis for successive steps into a predetermined number of increments and using the multiplexed divided positional signals for the conveyor and the six controlled axes as artificial command signals during respective interpolation intervals for comparison respectively with the conveyor encoder and the encoders for the six controlled axes. The number of interpolation intervals is equal to the predetermined number of increments and the interpolation intervals are generated in a variably spaced relationship. The number of effective interpolation intervals in a specific embodiment is $2^n$ relative to the range of basic displacement units of conveyor position between successive program steps of $2^n$ to $2 \times 2^n$. In effect, the spacing of the $2^n$ interpolation intervals are averaged or spread out over the time corresponding to the conveyor movement of $2^n$ to $2\times2^n$ basic displacement units wherein certain command signals are spaced apart by the period of two basic displacement units and the remaining command signals are spaced apart by one basic displacement unit (at nominal conveyor velocity).

The generation of successive artificial signals is controlled by the comparison of the previous artificial command signal and the present conveyor encoder position. The variable duration interpolation interval generation of artificial command signals eliminates the necessity of a computer or microprocessor during the replay mode of additional complicated binary multiplier and divider stages which would be necessary if a variable multiplier were utilized to produce an exact number of effective interpolation intervals equal to the number of basic displacement units of conveyor position between successive program steps. Further, the time as well as the cost to execute these alternative methods could be prohibitive in many applications. The noise immunity and accuracy of the calculations might also be affected with a resultant decrease in the safety of operation of the manipulator apparatus.

Figure 2:
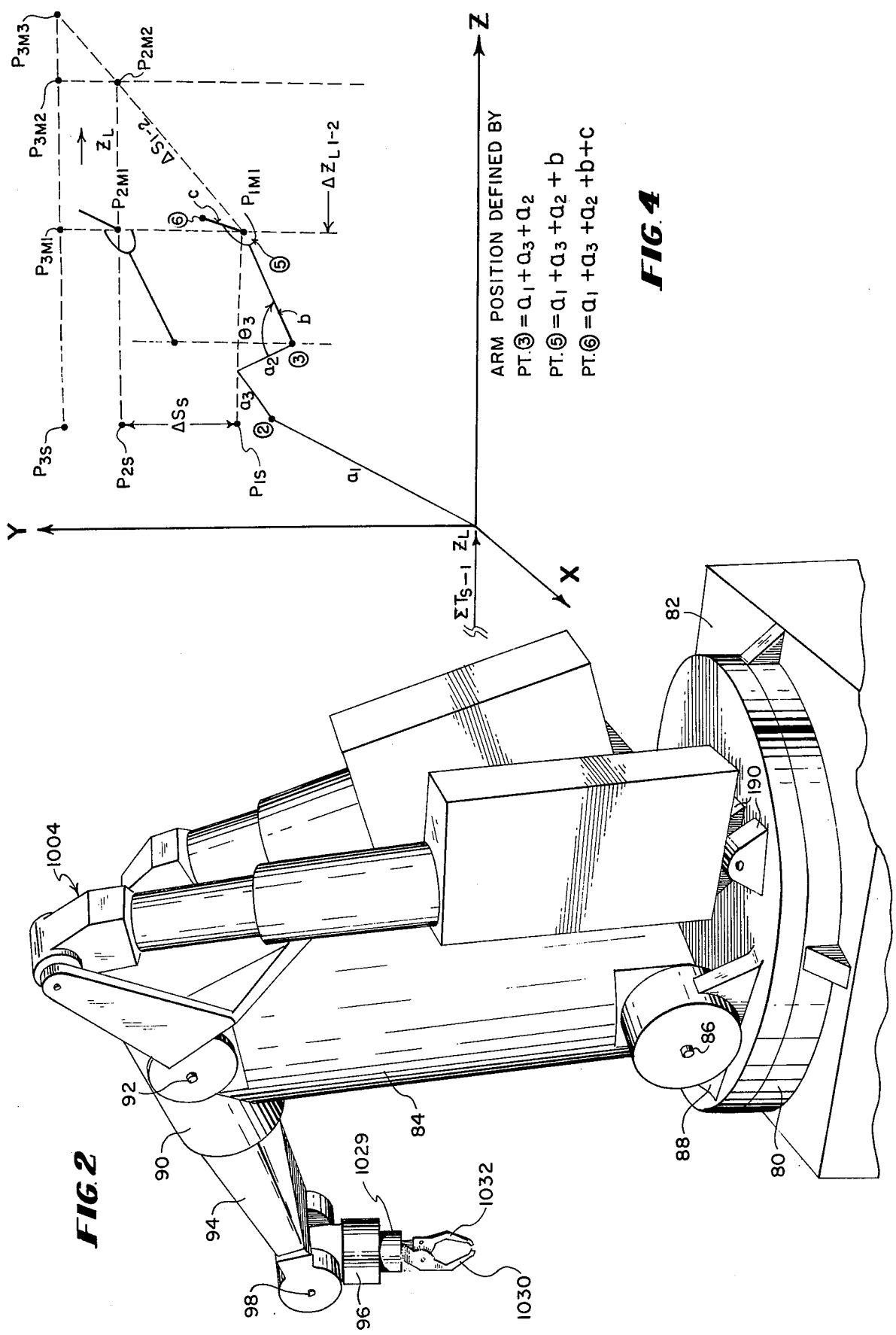
FIG. 2 is a perspective view of the programmable manipulator apparatus of the present invention utilized in conjunction with the moving conveyor arrangement as shown in FIG. 1.

Considering now the mechanical arrangement of the manipulator arm 1004, and referring more particularly to FIG. 2, the manipulator arm includes a rotary platform 80 which is movable about a vertical axis and is supported by the main base member 82 of the manipulator 1004. A shoulder arm portion 84 is pivotally mounted on a horizontal shoulder joint or axis 86 by means of a pair of upstanding ear portions 88 and 89 on the platform 80. An elbow arm portion 90 is pivotally mounted on the upper end of the shoulder arm portion 84 and is connected to the arm portion 84 by means of a horizontal elbow joint or axis 92. A forearm portion 94 which is coaxial with the elbow arm portion 90 is rotatable about the axis of the elbow arm portion 90 to effect a so-called forearm twist motion. The outer end of the manipulator hand 96 is provided with a socket adapted to receive one of several manipulator hands or welding guns such as 1029 and may be rotated about a wrist bend axis 98 at the end of the forearm portion 94. The outer end portion 96 of the manipulator hand may also be rotated in a wrist swivel axis which is perpendicular to and intersects the wrist bend axis 98.

Considering now the electronic circuitry and computer assist facilities which are provided in accordance with the present invention to enable the manipulator arm to be initially taught to perform a series of operations and then repeat these taught operations during a series of playback or replay cycles, it is first pointed out that the control system for each manipulator apparatus 1044 is of the same general type as described in detail in copending application Ser. No. 625,932, and reference may be had to said application for a detailed description of this general type of control system.

During playback, the actual position of the manipulator arm, as indicated by the digital encoders associated with each axis, is compared with the digital command signals previously recorded in the memory during the teaching operation, the output of the comparator providing an error signal which is employed to control the drive means in each axis so as to move the manipulator arm to the new commanded position. In the case of the three main axes of the manipulator, i.e. the waist, shoulder and elbow arm motions, the digital encoders are driven directly from the hydraulic motor which drives a ball screw. In order to provide a digital position signal corresponding to each of the three other axes of the manipulator, i.e. the forearm twist axis, the wrist bend axis and the wrist swivel axis, while at the same time providing an arrangement which makes these digital signals available with a minimum complexity even though these signals represent movement of the manipulator hand at the outer end of the manipulator arm, a series of three encoders are mounted on the elbow housing.

Figure 3:
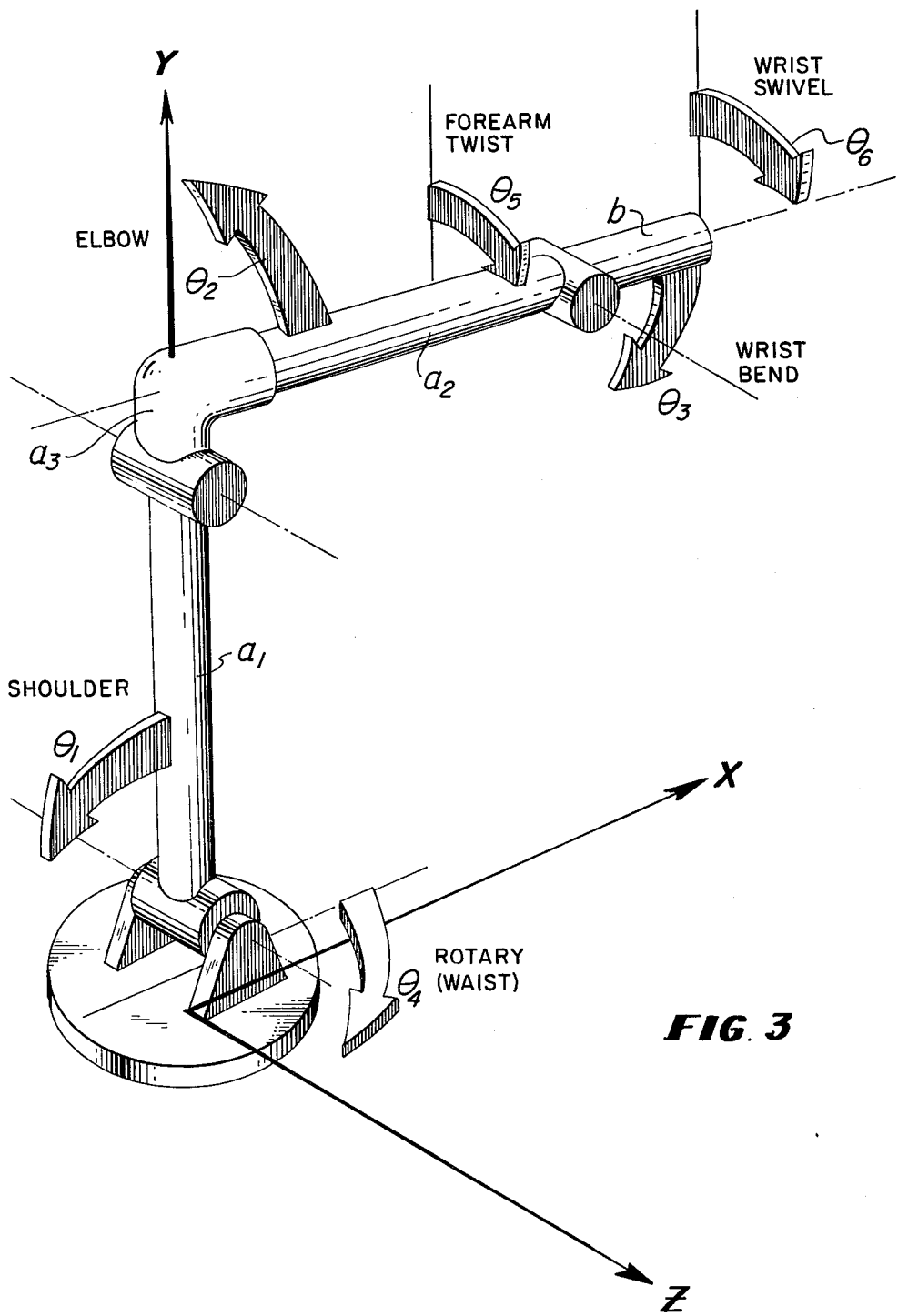
FIG. 3 is a diagrammatic perspective view of the manipulator of FIG. 2 and illustrating the six controlled axes of the manipulator.

Considering now the calculations performed during the teach-assist mode while the conveyor is standing still to permit the desired series of operations to be performed on the car body while the conveyor is moving during playback, reference is first made to FIGS. 3 and 4 and the Engelberger et al application Ser. No. 625,932 referred to above. The various relationships between the six controlled axes of the manipulator 1004 are shown in FIG. 3 in relation to a superimposed X, Y, Z Cartesian coordinate axis system, movement in each of the six controlled axes being identified by a particular angle. Thus, motion in the rotary axis is identified as $\theta_4$, motion in the shoulder axis is identified as $\theta_1$, motion in the elbow axis is identified as $\theta_2$, motion in the forearm twist axis is identified as $\theta_5$, motion in the wrist bend axis is identified as $\theta_3$, and motion in the wrist swivel axis is identified as $\theta_6$. The position of each of the motions indicated in FIG. 3 is given by the encoder associated with each axis wherein the encoder outputs when converted to angular information will be defined as $\theta_{1e}$ to $\theta_{6e}$, inclusive. As is evident from the pictorial representation in FIG. 3, a number of the movements in the various controlled axes are in series with one another so that there are various interactions between the different degrees of motion. Thus, when one axis is rotated it imparts a motion to another axis. In some cases the motion caused by interaction with another axis is not measured by the respective encoder. Therefore, $\theta_N$ does not equal $\theta_{Ne}$ for some axes. In other cases, more than one axis imparts an interaction to a particular axis. Thus, the following relationships exist between $\theta_1$ to $\theta_6$:

$$\theta_1 = \theta_{1e}$$

$$\theta_2 = \theta_{2e}$$

$$\theta_3 = \theta_{3e} + 1/32\ \theta_{5e}$$

$$\theta_4 = \theta_{4e}$$

$$\theta_5 = \theta_{5e}$$

$$\theta_6 = \theta_{6e} + 1/16\ \theta_{3e} + 17/512\ \theta_{5e}$$

Also, since it is necessary for the calculations associated with the present invention to convert from encoder values $\theta_1$ to $\theta_6$ values, the following expressions are also provided:

$$\theta_{1e} = \theta_1$$

$$\theta_{2e} = \theta_2$$

$$\theta_{3e} = \theta_3 - 1/32\ \theta_5$$

$$\theta_{4e} = \theta_4$$

$$\theta_{5e} = \theta_5$$

$$\theta_{6e} = \theta_6 - 1/16\ \theta_3 - 1/32\ \theta_5$$

Further relationships are also obtained to define the relationships of the above angles to insure that the calculations are constrained to the individual mechanical rotational design limits of the various angles as discussed in the above referenced Engelberger et al application Ser. No. 625,932.

In order to calculate the desired positions in each of the six controlled axes, including the effects of conveyor motion, it is necessary to transform the $\theta$ values given by the encoder outputs and inter-relationships of the axes above into corresponding Cartesian coordinates, i.e. X, Y and Z components so that the increments of motion necessary to translate from static to moving points may be added in Cartesian coordinates. It is then necessary to transform the new modified translational Cartesian coordinates back into polar coordinate form in order to yield $\theta$ values which are then recorded into memory to be utilized as command signals in the replay mode.

The calculations necessary to obtain the desired positional coordinates of a point taking into account conveyor movement during playback may be simplified by making certain assumptions regarding the relationship of the forearm, wrist bend and wrist swivel axes, as described in detail in Engelberger et al application Ser. No. 625,932. Referring to FIG. 4, the various articulations which are interconnected to make up the manipulator arm are shown. The vector $a_1$ represents the shoulder arm portion 84, and the vectors $a_2$ and $a_3$, which are at right angles, represent collectively the orientation of the elbow arm portion 90. The component $b$ represents the manipulator hand 96, identified as point 3 (numeral within a circle), and movement of the element $b$ in the wrist bend axis corresponds to the indicated angle $\theta_3$. The element $c$ represents the outermost portion of the manipulator hand 96, the end effector such as a weld gun tip, extending at right angles to the element $b$. The end effector or tip is identified as point 6 and the intersection of elements $b$ and $c$ as point 5. When the manipulator hand is rotated in the wrist swivel axis to produce a change in $\theta_6$, the end effector (pt. 6) moves in a plane perpendicular to the element $b$. It will then be seen that the manipulator arm 1004 is comprised of serially connected vector elements $\bar{a}_1$, $\bar{a}_2$, $\bar{a}_3$, $\bar{b}$ and $\bar{c}$. Furthermore, orientation of this arm is controlled by varying the joint angles $\theta_1$ through $\theta_6$, inclusive. Point 3, FIG. 4, is defined as the sum of the vectors $\bar{a}_1 + \bar{a}_2 + \bar{a}_3$. Similarly point 6 is defined as the sum of the vectors $\bar{a}_1 + \bar{a}_2 + \bar{a}_3 + \bar{b} + \bar{c}$ and point 5 is defined as the sum of the vectors $\bar{a}_1 + \bar{a}_2 + \bar{a}_3 + \bar{b}$.

In the static conveyor teach-assist mode, the operator moves the arm with the teach controls to a first point of the desired program or a first point $P_{1s}$ in a series of points and the encoder data corresponding to this point is supplied to the computer. The operator then positions the arm to the next desired point $P_{2s}$ on the workpiece without moving the conveyor, which in FIG. 4 is a translation only in the Y direction for illustrative purposes, and encoder data corresponding to this point is similarly fed to the computer. The point $P_{1ml}$ is the projected location of a static point $P_{1s}$ on the car body when the car body is at the conveyor position corresponding to the program step assigned to $P_{1s}$. The point $P_{1ml}$ may then be referred to in replay as point $P_1$ at the program time 1 with conveyor motion. The point $P_{2ml}$ is then the location of the static point $P_{2s}$ on the car body at the conveyor position corresponding to program step 1 or point $P_{2s}$ at the program time 1 with conveyor motion. If point $P_1$ is the first step of the entire program, points $P_{1ml}$ and $P_{2ml}$ are the points $P_{1s}$ and $P_{2s}$, respectively.

The computer now proceeds to calculate the appropriate data providing for the projected or anticipated maximum velocity of the conveyor line at a rate $Z_L$ equal to 6 inches/second while the manipulator arm is moving from $P_{1ml}$ to $P_{2m2}$, the projected point $P_{2m2}$ being illustrated in FIG. 4 (the conveyor motion may be in a direction involving Y and Z coordinates also as will be explained in detail hereinafter). The point $P_{2m2}$ is the projection of the point $P_{2s}$ at the program time of step 2 with projected conveyor motion. In this figure the desired movement or trajectory that the manipulator arm must follow is shown as $\Delta S_{1-2}$, the arm following this trajectory in replay in order to arrive at the desired $P_{2s}$ on the workpiece relative to $P_{1s}$ with the conveyor moving. The speed of movement of the manipulator arm when traversing $\Delta S_{1-2}$ is identified as $\dot{S}$.

To calculate $P_{2m2}$ during the teach mode, the critical arm points 3, 5 and 6 for $P_{1ml}$ and $P_{2m2}$ in static angle format $\theta_1$ through $\theta_6$ are first expressed in Cartesian coordinate matrix form as follows (The transformation from polar to Cartesian coordinates is accomplished by the trigonometric relationships as described in the referenced copending Engelberger et al application Ser. No. 625,932.):

$$P_{1ml} = \begin{Vmatrix} X_{6_{1ml}} \\ Y_{6_{1ml}} \\ Z_{6_{1ml}} \end{Vmatrix}_{\textcircled{6}}, \begin{Vmatrix} X_{5_{1ml}} \\ Y_{5_{1ml}} \\ Z_{5_{1ml}} \end{Vmatrix}_{\textcircled{5}}, \begin{Vmatrix} X_{3_{1ml}} \\ Y_{3_{1ml}} \\ Z_{3_{1ml}} \end{Vmatrix}_{\textcircled{3}}$$

$$P_{2ml} = \begin{Vmatrix} X_{6_{2ml}} \\ Y_{6_{2ml}} \\ Z_{6_{2ml}} \end{Vmatrix}, \begin{Vmatrix} X_{5_{2ml}} \\ Y_{5_{2ml}} \\ Z_{5_{2ml}} \end{Vmatrix}, \begin{Vmatrix} X_{3_{2ml}} \\ Y_{3_{2ml}} \\ Z_{3_{2ml}} \end{Vmatrix}$$

To calculate $P_{1ml}$, the projected point of $P_{1s}$, it is necessary to define the conveyor position at this program step in terms of the projected number of basic displacement units traversed $\Sigma D_1$ from the beginning of the program as defined by the predetermined zero or starting point of the conveyor. It should be remembered that program synchronization and control is determined by conveyor postion and not elapsed program time although it is more conventional and logical for programmers and operating personnel to speak of elapsed program time up to a specific program step. In effect the conveyor position from the start to the program step corresponding to the point $P_1$ can be defined as the projected elapsed time of the program $\Sigma T_s$ multipled by the nominal conveyor speed $\dot{Z}_L$. The term $\Sigma D_1$ is available from the memory of the control electronics since the projected conveyor encoder displacement units are calculated and recorded at each program step of the teach programming process to control the advancement of the program in replay. The point $P_{1ml}$ may then be expressed in matrix form as follows (illustrating an example of conveyor motion in the Z direction only):

$$P_{1ml} = \text{origin to } \textcircled{6}$$
$$\begin{Vmatrix} X_{6_{1s}} \\ Y_{6_{1s}} \\ Z_{6_{1s}} + [\Sigma D_1] \end{Vmatrix},$$

-continued $$\begin{Vmatrix} X_{5_{1s}} \\ Y_{5_{1s}} \\ Z_{5_{1s}} + [\Sigma\, D_1] \end{Vmatrix}_{\text{origin to } \textcircled{5}},$$

$$\begin{Vmatrix} X_{3_{1s}} \\ Y_{3_{1s}} \\ Z_{3_{1s}} + [\Sigma\, D_1] \end{Vmatrix}_{\text{origin to } \textcircled{3}}$$

Therefore, only the Z terms of $P_{1m1}$ have changed from $P_{1s}$ by a factor contained in the previously recorded program step as projected conveyor position. Alternatively, a recall of the polar coordinates of point $P_{1m1}$ from memory and appropriate conversion to Cartesian coordinates is also possible.

The components of translation from $P_{1m1}$ to $P_{2m2}$ are now calculated utilizing the relationship from FIG. 4, $$\overline{\Delta S}_{1\text{-}2} = \overline{\Delta S}_s + \overline{\Delta Z}_{L1\text{-}2}.\textcircled{5}$$

where $\Delta Z_{L1\text{-}2}$ corresponds to the distance traversed by the conveyor during the time the manipulator arm moves from $P_{1s}$ to $P_{2s}$. It can be seen that the speed of the manipulator arm $\dot{S}$ must be greater than the conveyor speed $\dot{Z}_L$ for the manipulator arm to move ahead on the workpiece as the conveyor moves in the same direction. The translational distance $\Delta S_s$ (static) is calculated from point $P_{1s}$ to $P_{2s}$, similarly to a TASK II calculation in the Engelberger et al application Ser. No. 625,932;

$$\Delta S_s = \sqrt{(X_5{}^{2s} - X_5{}^{1s})^2 + (Y_5{}^{2s} - Y_5{}^{1s})^2 + (Z_5{}^{2s} - Z_5{}^{1s})^2}.$$

Only the Z coordinates of $P_{1s}$ and $P_{2s}$ will vary under moving conveyor conditions, since the only motion contributed by the conveyor to the static workpiece positions is in the Z direction. Thus, the X and Y coordinates along with the vectors $\bar{b}$ and $\bar{c}$ will remain unchanged. In terms of the example shown in FIG. 4, with a $P_{1\text{-}2}$ translation in the Y direction of two inches for example, $\overline{\Delta S}_{1\text{-}2}$ can be rewritten as $\overline{\Delta S}_{1\text{-}2} = \bar{i}x\,(o) + \bar{j}\,(+2) + \bar{k}((o) + \overline{\Delta Z}_{L1\text{-}2})$. The term $\overline{\Delta Z}_{L1\text{-}2}$ may also be rewritten as $T_{1\text{-}2} \cdot \dot{Z}_L$ and upon simplification yields $\overline{\Delta S}_{1\text{-}2} = \bar{j}2 + 6\bar{k}\,T_{1\text{-}2}$ for $\dot{Z}_L = 6$ inches/second. To solve this expression, the time $T_{1\text{-}2}$ to traverse $\overline{\Delta S}_{1\text{-}2}$ at twelve inches/second manipulator speed is calculated in terms of a number of basic displacement units of the conveyor encoder 1028, at a nominal conveyor line speed $\dot{Z}_L$. Accordingly, equating $\Delta S_{1\text{-}2} = \sqrt{2^2 + (T_{1\text{-}2} \cdot 6)^2}$ to $\Delta S_{1\text{-}2} = \dot{S} \cdot T_{1\text{-}2}$ yields $\Delta S_{1\text{-}2} = \dot{S} \cdot T_{1\text{-}2} = \sqrt{2^2 + (T_{1\text{-}2} \times 6)^2} = $ twelve inches/second $\cdot T_{1\text{-}2}$. Simplifying this equation results in a $T_{1\text{-}2}$, projected time to traverse from points $P_{1m1}$ to $P_{2m2}$ of approximately 0.192 seconds at a nominal conveyor speed. The number of basic displacement units that are traversed at the maximum conveyor speed and that correspond to a time interval of 0.192 seconds can then be calculated as follows:

Number of displacement units =

$$D_{1\text{-}2} = \frac{T_{1\text{-}2}}{T\,\text{unit}} = \frac{.192}{.00234} = 82.22 \text{ intervals.}$$

The program step to traverse from point one to point two, $P_1$ to $P_2$, would thus be recorded as an 82 basic displacement unit step to complete the $\Delta S_{1\text{-}2}$ translation. Rounding off the number of intervals to the next lower interval corresponds to a slightly higher arm speed to accomplish the translation within the correct time. Although a specific simplified example of a translation only in the Y direction has been described between the static points $P_{1s}$ and $P_{2s}$, it should also be realized that any translational combination of changes in the X, Y and Z coordinate direction is also contemplated between successive statically taught points. Further, it should also be understood that the direction of conveyor line motion is not restricted to the Z axis direction and may also include an orientation so as to include X and Y components or any combination of components in the X, Y and Z directions. In that case the calculations would include vectorial addition of line motion components in the X and Y axes.

With the calculated $T_{1\text{-}2}$, 0.192 seconds in this example, the actual coordinates of $P_{2m2}$ may now be calculated as follows:

$$P_{2m2} = \textcircled{6}$$

$$\begin{Vmatrix} X_{6_{2s}} \\ Y_{6_{2s}} \\ Z_{6_{2s}} + \Sigma\, D_2 \end{Vmatrix}_{\textcircled{5}},$$

$$\begin{Vmatrix} X_{5_{2s}} \\ Y_{5_{2s}} \\ Z_{5_{2s}} + \Sigma\, D_2 \end{Vmatrix}_{\textcircled{3}},$$

$$\begin{Vmatrix} X_{3_{2s}} \\ Z_{3_{2s}} + \Sigma\, D_2 \end{Vmatrix}$$

where $\Sigma\, D_2 = \Sigma\, D_1 + D_{1\text{-}2}$ which is now defined by the factor $D_{1\text{-}2}$ being equal to the calculated number of displacement units of projected conveyor travel during the projected traverse of the arm from point $P_{1m1}$ to $P_{2m2}$.

With the Cartesian coordinates of $P_{2m2}$ now defined, the polar coordinates $\theta_1$ through $\theta_6$, inclusive, for point $P_{2m2}$ are calculated by the inverse transformation from Cartesian to polar coordinates from trigonometric relationships as discussed in detail in the above referenced copending Engelberger et al application Ser. No. 625,932. The polar coordinates $\theta_1$ through $\theta_6$ for point $P_{1m1}$ calculated in the previous program step along with $\theta_1$ through $\theta_6$ for point $P_{2m2}$ define the start and end points of the proposed path movement under projected conveyor line operation and are recorded into memory at an appropriate address location for the controlled axes along with the number of displacement units for the conveyor axis required to traverse the distance.

This procedure is repeated for the next point that requires a movement on the workpiece or car body 1002 such as a point $P_{3s}$ with the same procedure being utilized to calculate the projected moving conveyor positional data from $P_{2m2}$, $P_{2s}$ and $P_{3s}$ data, whereupon the data for $P_{3m3}$ is calculated and recorded. This static conveyor line programming procedure by calculating projected data to match the moving conveyor situation in replay continues over a series of operations to be performed on the workpiece within a defined area such as one foot. The operator then reads the last recorded conveyor position projected at the last taught program point and advances the conveyor to a point approximately six inches or so beyond this point along with the manipulator arm to begin programming and teaching the manipulator arm position statically over the next range of interest. The computer due to anticipated computational inaccuracies may signal the operator during a series of static teach points to advance the conveyor before new points are to be calculated and recorded. Also, anticipated collision problems between the workpiece and the manipulator may require the operator to advance the conveyor line before a static interval of one foot is taught. The collision problems arise due to the three dimensional character or depth of the workpiece wherein the manipulator arm may have to work around open car doors or within the car frame. The accomplishment of the program in replay so that conveyor line synchronization is maintained by the recorded number of positional conveyor intervals will be described in detail hereinafter.

Considering now the programming of a weld in the static teach-assist mode, it is apparent that the weld gun electrodes 1030 and 1032 must maintain accurate contact with the desired point on the workpiece for a specified period of time necessary to form a proper weld. Further, the gun tip or end effector 1029 must then move at the projected conveyor line speed and in synchronism with $\dot{Z}_L = \dot{S}$ over the weld time period as well as during the time the weld gun tip is closing before the weld and opening after the weld. Assuming a $\dot{Z}_L$ of six inches per second and a minimum weld time cycle of 0.25 seconds, the static point with conveyor travel will have moved 1.5 inches. The weld cycle allows 0.05 seconds for gun closing and 0.05 seconds for gun opening, both of which take place at the conveyor line velocity to assure accurate positioning of the weld spot since the open and close times are not precisely defined. The weld must then be performed by locating the exact point and moving in synchronism with the point for the specified period of time.

The calculation necessary to statically record the necessary data to perform a projected weld cycle involves the recorded positional data of the last program step and a similar calculation of moving from one point to another, $P_{1s}$ to $P_{2s}$ as discussed previously. Once the coordinates of $P_{2m2}$ are calculated and recorded corresponding to the start of the weld cycle, the next program step is recorded as a weld cycle wherein the speed is recorded as $\dot{Z}_L$ and the weld time period defines the number of conveyor displacement units programmed for the step. The positional data to locate the point at the end of the weld is a simplified calculation relative to the previous $P_1$ to $P_2$ movement calculation. The end of weld movement point is calculated by adding the translational distance of the weld cycle in X, Y, Z coordinates and transforming the data back to polar coordinates and recorded.

The program steps recorded for the combination of desired welds and translational movements between weld positions are all defined in the recorded program by positional cumulative conveyor data, encoder positional data for the controlled axes and an effective interpolation code that will be explained in detail hereinafter.

In addition to movement between different points on the workpiece and weld cycles where the manipulator tip moves with the workpiece, additional movement may be desired wherein the manipulator arm is to be moved in a direction which is reverse to both the conveyor advancement and to the stationary workpiece. This is in contrast to the above translation between points on the workpiece wherein the manipulator arm is moving in the $+Z$ direction or ahead of the conveyor advancement direction on the workpiece. If this traversing procedure is of small enough displacement, the manipulator controls would recognize a movement of one static-taught point to another in the reverse direction as a "wait" step since the conveyor will be advancing at approximately six inches per second. However, in other cases, time will be saved if the manipulator arm is moved in the reverse direction at twelve inches per second where longer distances are involved, the crossover or decision point being ascertained by the programming of the control electronics. In the reverse motion case, the procedure is one of two objects moving toward each other at different rates. The mathematical calculations are similar to those discussed hereinbefore except that $\dot{S}$ is now of the reverse sign or direction. The calculations are then similar to those above with a result of traverse time to impact point corresponding to a definite number of conveyor encoder displacement units. However, since it is not practical to instantaneously command a servo system to reverse direction, a technique of "stop and wait" will be advantageous. The dynamics of the manipulator arm require a 0.05 second interval to come to a stop and stabilize before commanding a reverse direction. Thus, the translational calculations are performed to calculate an end or stop point in the reverse direction which is exactly 0.05 seconds before and corresponding to 0.3 inches less than the impact point at a nominal conveyor line speed. The manipulator arm is then programmed to wait for 0.05 seconds while the conveyor line traverses 0.3 inches whereby the manipulator arm may then be programmed to contact the desired point which is then in alignment. If a weld is to be performed, the arm is then programmed to move at $\dot{Z}_L$, conveyor line velocity.

Figure 5:
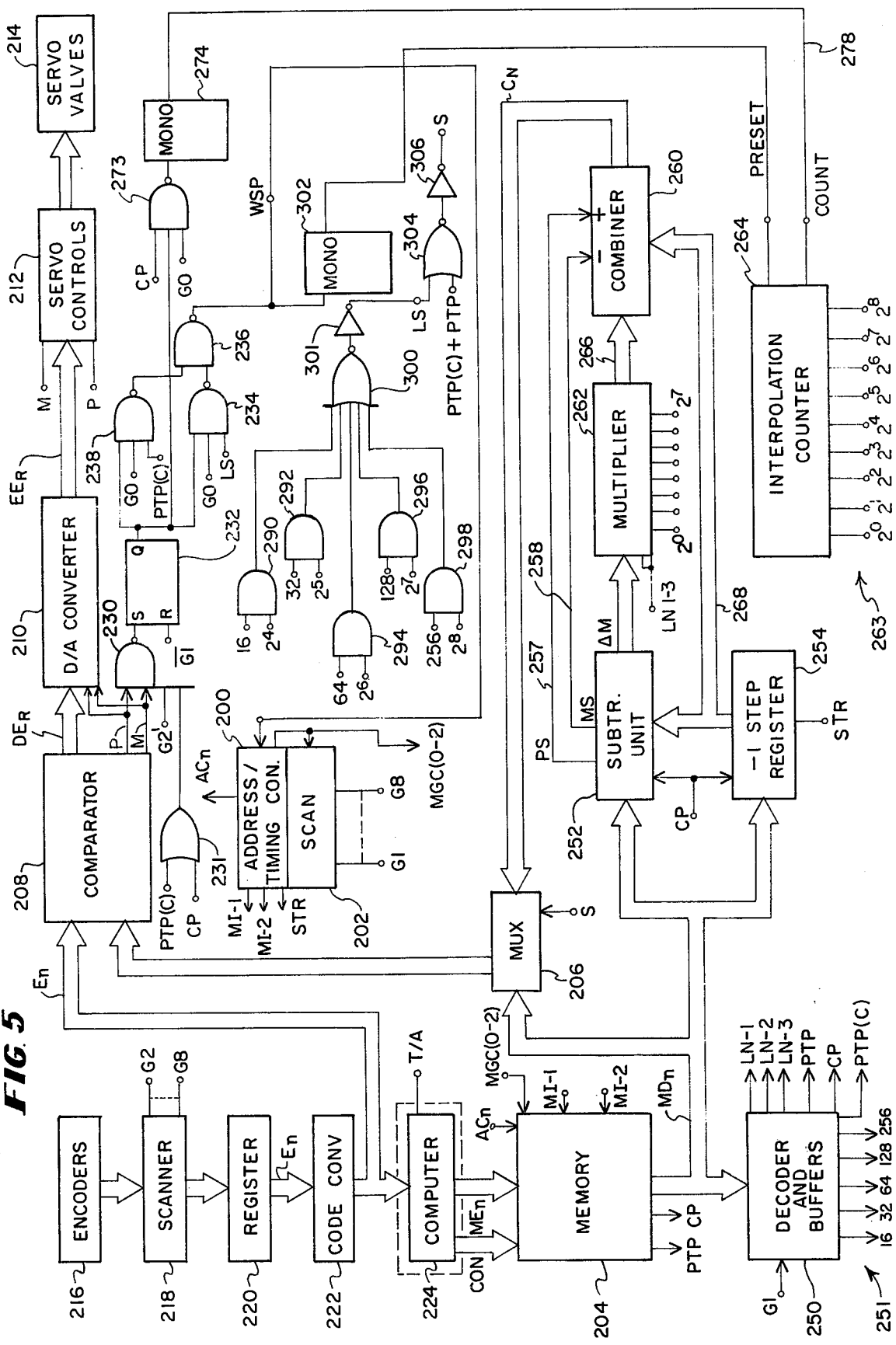
FIG. 5 is a logic and block diagram of the electronic control circuitry of the manipulator of FIG. 2 and illustrates the variable duration interpolation period unit of the present invention.
Figure 6:
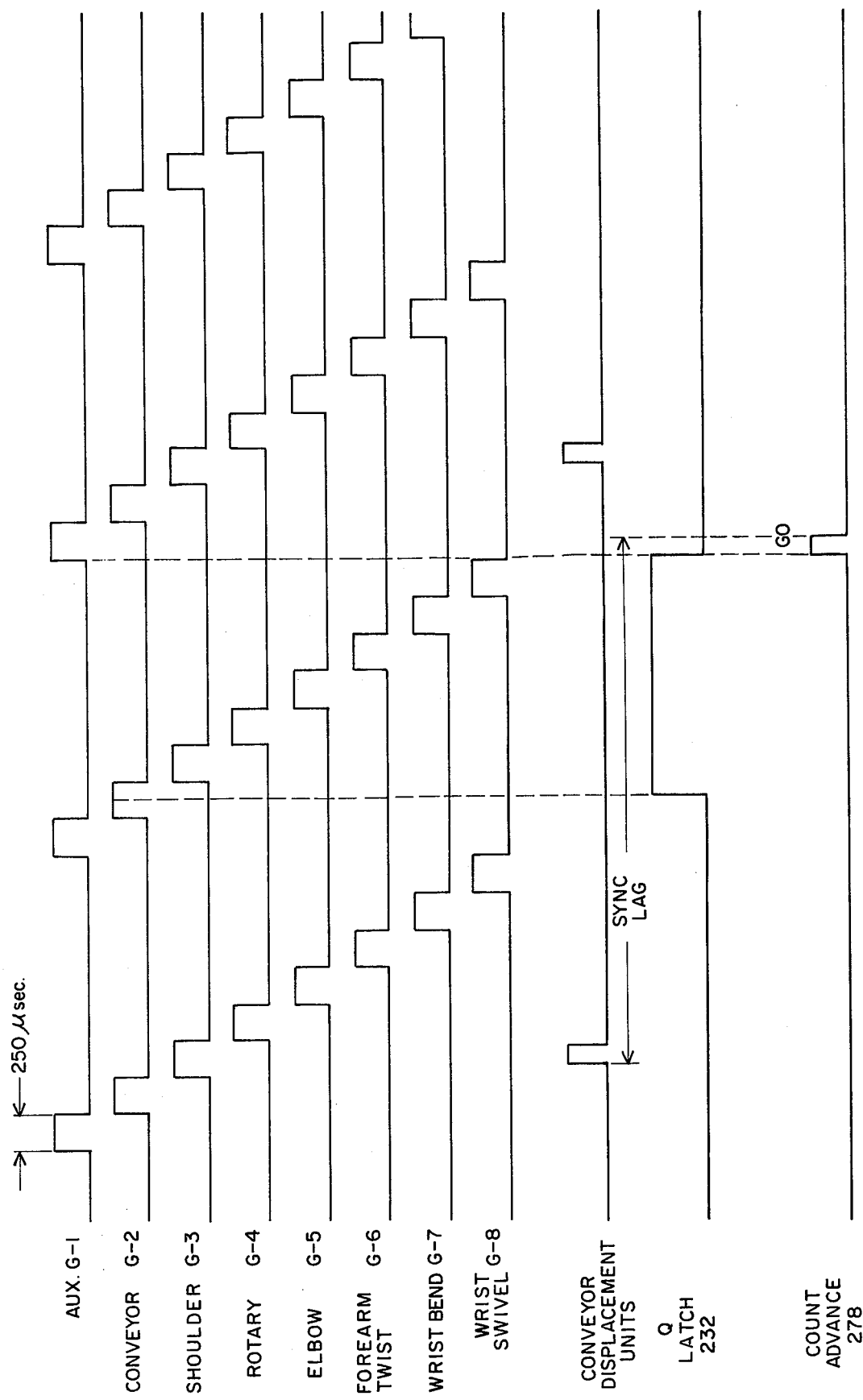
FIG. 6 is a diagrammatic representation of various waveforms occurring in the electronic circuitry of FIG. 5.

In conjunction with the control of the replayed program, reference is made to FIG. 5 and the electronic control circuitry of the present invention wherein the recorded program steps calculated during the teach-assist mode are stored in digital memory storage facilities indicated generally at 204. The digital data of the recorded program steps are read out of memory 204 under the control of step Address and Timing Control stage 200 and by means of a composite digitally coded address signal $AC_n$ and three lower LSD's MGC(0-2) as explained in more detail in the above referenced copending application Ser. No. 625,932. The signals MGC(0-2) are also supplied to a Scan Decoder stage 202 resulting in the G1, G2, G3, G4, G5, G6, G7 and G8 multiplex scan signals (waveform FIG. 6).

The multiplex scan signals G3, G4, G5, G6, G7 and G8 correspond to the enabling of positional data from memory at a particular selected address step of the shoulder axis, rotary axis, elbow axis, forearm twist axis, wrist bend axis and wrist swivel axis, respectively. In a multiplex fashion, digital positional data is outputed from memory at data output lines $MD_n$ with shoulder axis data appearing during scan cycle time G3, rotary axis data during scan cycle G4, elbow axis data during scan cycle G5, forearm twist axis data during scan cycle time G6, wrist bend axis data during scan cycle G7 and wrist swivel axis data during scan cycle time G8. During scan cycle time G1, auxiliary control function data is available including the type of program step desired and the number of effective interpolation intervals assigned to the particular step as calculated in the teach-assist mode as will be discussed in detail hereinafter. During scan time cycle G2, recorded conveyor positional data is provided on lines $MD_n$ representing the projected position of the conveyor corresponding to the recorded positional data for the six controlled axes of the manipulator and representative of the end of the current step position of the conveyor. The multiplex pulses on the output conductors G1 through G8, inclusive, provided from the octal decoder of Multiplex scan stage 202 each have a period of a nominal time duration of approximately 200 microseconds.

Considering now the operation in the point-to-point controlled, PTP (C), mode and the continuous path (CP) mode, the multiplexed output data $MD_n$ in the PTP and PTP (C) modes and data $C_N$ in the CP mode is connected through multiplexer switch 206 to one input of the digital comparator stage 208 by means of the mode signal S. The second input of the digital comparator 208 is connected to the digital multiplexed encoder outputs indicated generally as $E_n$. The comparator 208 digitally compares the two inputs and a digital error signal $DE_R$ is provided at the comparator output representing the magnitude of the difference between the actual position of the respective encoders and the commanded position signal $MD_n$ or $C_N$. Polarity outputs P and M are also provided from the comparator 208 to the converter 210. The digital error signal $DE_R$ is connected to a digital to analog converter stage 210 to provide an analog error signal $EE_R$ to the servo controls indicated generally as 212 which selectively control the respective servo valves indicated generally as 214. The comparator 208 and the digital to analog converter 210 are utilized in common for the six axes of the manipulator according to the multiplexed arrangement with servo control stage 212 including suitable sample and hold circuits to maintain the analog error signal $EE_R$ between successive multiplex scan cycles of a particular program step.

The encoders for the six controlled axes of the manipulator along with the conveyor encoder are indicated generally at 216 and supply digital positional data to a scanning stage 218 which provides the multiplexed encoder data under the control of the multiplex scan signals G2 through G8, inclusive. A register 220 receives the multiplexed encoder data on a plurality of data lines, for example, 15 bits of information, to provide an unambiguous data output during the second portion of each scan signal Gi wherein the data has been inputed to the register during a first portion of the scan signal Gi. The output $E_n$ of the register 220 is in grey code and is converted to binary code by a code converter stage 222 which is a grey to binary converter. In the teach mode, the output of converter 222 is supplied to a conventional computer indicated generally at 224 which is enabled only during the teach-assist mode to perform the calculations discussed heretofore whereupon the calculated data is provided to the data input $ME_n$ of memory 204 to be recorded for replay. The computer 224 is utilized only for teach-assist calculations and may be inactive or physically disconnected from the manipulator system during replay and utilized elsewhere for teach-programming. The computer 224 may include control signal outputs referred to generally as CON in FIG. 5 and may comprise memory initiate and mode control signals to control the memory 204. The above described electronic control circuitry may be substantially similar to that described in detail in the above-identified Engelberger et al application Ser. No. 625,932.

Further, considering the PTP (C) mode of operation, the manipulator arm 1004 is directed in a point-to-point controlled, PTP (C), mode wherein successive program steps are supplied from the memory 204 to the comparator 208 as position command signals which are compared with the actual position signals of the encoders of the six controlled axes, the manipulator arm being moved in all six controlled axes to reduce the error signals in these axes. The digital comparator 208 in addition to the digital error signal $DE_R$ provides outputs P and M indicative of the direction of the error signals as plus or minus respectively to direct the servo controls 212 to operate the servo valves 212 in a manner to reduce the error in each respective axis.

The program is advanced from step to step by detecting when the P and M signals are both a high logic level signifying coincidence during the G2 scan cycle corresponding to the comparison between the conveyor encoder and conveyor command signals. The advancement to the next step upon the desired comparison criteria occurs regardless of the error signals in the six controlled axes at the time of the program step advance. It should also be understood that the program may be advanced from step to step when the error signal is below a predetermined value for the conveyor axis similar to the advancement of the program in the PTP mode upon the error signal being below a predetermined value for the six controlled axes. The teach program calculations are, however, calculated such that the manipulator arm speed is sufficient to ensure the achievement of desired arm positions prior to the "seventh axis" conveyor coincidence. To provide the conveyor coincidence signal, the P and M signals are each connected to an input of a four input NAND gate 230 with the output of gate 230 connected to the set input S of a coincidence latch 232. The remaining two inputs of gate 230 are connected to a narrow pulse signal G2' developed during the middle of the G2 scan interval and the output of a two input OR gate 231 having the CP mode signal and the PTP (C), point-to-point (controlled), signal as inputs. The reset input of latch 232 is connected to the inverse of the G1 conveyor scan multiplex pulse, $\overline{G1}$, whereby upon the occurrence of high logic levels on the P and M lines and being in either the CP mode or the PTP (C) mode signal during scan period G2, the latch 232 is set to produce a high logic signal at the Q output which is connected to one input of a three input NAND gate 234. The other two inputs of NAND gate 234 are connected to a signal indicating the last interpolation step in the CP mode, LS, whose generation will be explained in detail hereinafter and a timing signal GO which is derived during the last half of scan signal G8. The output of gate 234, with coincidence from latch 232, the occurrence of GO and the LS signal (last interpolation step of a CP step) provides a high logic level through the two input NAND gate 236 to provide a program step advance signal WSP to the address control logic 200.

The Q output of the latch 232 is also connected to one input of a three input NAND gate 238. The other two inputs of gate 238 are connected to the PTP (C) mode signal and the timing signal GO. The output of gate 238 with coincidence from the latch 232, the occurrence of GO and the PTP (C) mode signal provides a high logic level through gate 236 to provide the WSP advance signal for the PTP (C) mode.

Advancement of the program from step to step by the coincidence of the conveyor encoder and the conveyor command signals from memory ensures the synchronization of the manipulator apparatus 1004 with the conveyor line 1000 for the PTP (C) mode.

In accordance with an important aspect of the present invention and for movement either with respect to the workpiece or for a weld step during which the manipulator maintain a stationary position on the workpiece, a variable duration interpolation period unit, referred to hereinabove, is provided for operation in the continuous path (CP) mode and continuous path weld ($CP_w$) mode to achieve substantially constant velocity between programmed steps while maintaining synchronism with the conveyor movement between recorded points by providing command signals during a predetermined number of effective interpolation intervals artificially generated from the calculated teach-assist positional data which was recorded during the teaching phase. The interpolation intervals are generated in a variably spaced predetermined relationship and in synchronism with the conveyor encoder.

The variable duration interpolation period unit subtracts the recorded conveyor positional signals and recorded command signals for the six controlled axes on a multiplex basis for the current and previous program steps, divides these differences into a predetermined number of increments equal to the number of effective interpolation intervals recorded for the current step during the teach phase, successively adds these increments to the respective data for the previous step and utilizes the resulting incremental added signals during the interpolation intervals as positional command signals for the six controlled axes of the manipulator and as a synchronization comparison signal for the conveyor.

The generation of successive artificial command signals is controlled by the comparison of the previous artificial command signal for the conveyor axis and the conveyor encoder output. The number of effective interpolation intervals in a specific embodiment is $2^n$ relative to the range of basic displacement units of conveyor position between successive program steps being in the range of $2^n$ to $2 \times 2^n$. In effect, the interpolation intervals have a predetermined pattern of variable duration during which a respective artificial command signal is generated for each axis and the conveyor and in a specific embodiment the duration of certain predetermined interpolation intervals is the period of two basic conveyor displacement units (the actual time during playback to traverse two conveyor displacement units) and the remaining interpolation intervals have a duration equal to the period of one basic conveyor displacement unit (also the actual time to traverse one conveyor displacement unit during playback). The pattern of single and double period interpolation intervals is determined by the ratio of the number of basic conveyor displacement units between the conveyor data of the current and previous program steps and the number of effective interpolation intervals recorded during the teach phase for the current step. A double period interpolation interval is realized when the command signal for the conveyor corresponding to that interpolation interval is two basic conveyor displacement units greater than the command signal for the previous interpolation interval. In this way, the conveyor synchronizing command signals having values over the range of $2^n$ to $2 \times 2^n$ basic conveyor displacement units are generated during the corresponding $2^n$ effective interpolation intervals. The number of command signals that differ by two basic displacement units from their respective previous command signals and thus the number of double period duration interpolation intervals corresponding to these command signals is equal to the difference between the number of basic conveyor displacement units for the step and the number of interpolation intervals.

Considering the detailed operation more specifically, the variable duration interpolation period unit first subtracts the present command position from the previous command position signal on a multiplex basis resulting in a difference signal corresponding to the positional change for each of the seven axes to be accomplished for that step. The positional difference signal for each of the axes is then divided by a number corresponding to a predetermined number of effective interpolation intervals as recorded in the teach-assist mode calculation resulting in a predetermined number of divided difference signals or increments utilized to produce effective interpolation interval command signals.

In the first effective interpolation interval, the resultant divided difference signal or incremental change is added to the initial position of the previous step which is the first of the predetermined number of effective interpolation commands which are artificially generated positional commands developed by the variable duration interpolation unit in response to a single recorded program step. This command signal is maintained until coincidence is achieved between the artificially generated interpolation interval conveyor command signal and the conveyor encoder output as determined by the comparator 208. The divided incremental change for the multiplex conveyor scan interval, G2, is the projected conveyor positional difference of the successive command steps recorded, e.g., $807 - 500 = 307$ conveyor encoder displacement units divided by the assigned number of effective interpolation intervals, e.g. 256 in a specific case resulting in a number greater than unity, e.g. 1.199. The assigned number of effective interpolation intervals in a specific embodiment is a binary multiple of 16, i.e: 16, 32, 64, 128 or 256. The assigned number is always chosen to be less than or equal to the number of basic conveyor displacement units. The first generated command signal for the conveyor axis is one increment or divided positional difference signal greater than the initial position such as 500 plus 1.199 or 501.199 with the excess of the result such as 0.199 being disregarded or rounded off by the interpolation unit.

When the conveyor encoder reaches the position corresponding to a position of 501, the coincidence status from the comparator is utilized to advance the interpolation unit to the second generated command signal which is $500 + 2(1.199) = 502.398$. Again, the fractional portion is disregarded when utilized for comparison with the present conveyor encoder output and thus the second artificial command signal for the conveyor axes is 502. Upon the conveyor encoder reaching this position, coincidence is detected and the third command signal is generated. The formula describing the generation of the series of artificial commands is:

$$\text{Command}_m = \qquad (10)$$

$$\frac{\left(MD_n[\text{step }(k)] - MD_n[\text{step }(k-1)]\right)m}{N} +$$

$$MD_n[\text{step }(k-1)]$$

where $MD_n[\text{step }(k)]$ is the recorded data for the present program step, $k$; $MD_n[\text{step }(k-1)]$ is the recorded data for the previous step, $k-1$; N is the number of effective interpolation intervals recorded for step $k$; and $m$ is the number of the artificial command in the sequence of commands with $m$ taking on the values 1 to N. For the second interpolation interval the conveyor axis command signal, with $m=2$, is:

$$500 + \frac{(807 - 500)(2)}{256} = (1.199)2 + 500 = 502.398$$

The above process continues with the fifth artificial command step $C_5 = 5.996 + 500$ or 505.

The sixth artificial command signal is $C_6 = 500 + 7.195 = 507$ for comparator coincidence purposes. The command signals for successive intervals are $C_1 = 501$, $C_2 = 502$, $C_3 = 503$, $C_4 = 504$, $C_5 = 505$ and $C_6 = 507$. The seventh command signal will be generated when the conveyor encoder reaches position 507 as determined by the conveyor encoder output. The duration of the interpolation intervals corresponding to the successive command signals $C_1$, $C_2$, $C_3$, $C_4$ and $C_5$ is nominally equal to the period of one basic conveyor displacement unit; the time to traverse one basic conveyor displacement unit at the nominal conveyor velocity. The actual duration of each interpolation interval in playback is of course varied by the actual conveyor velocity. The duration of the sixth interpolation interval corresponding to command signal $C_6$ is nominally two periods of the basic conveyor displacement unit. The duration of every fifth interpolation interval thereafter will be twice the duration of the preceeding four command signals (nominally) as described by equation 10. In effect, the series of 256 command signals approximately describes a repeating pattern of four single period duration interpolation intervals followed by one of two period duration. Due to the ratio 1.199 being very close to 1.20 the first pattern is five single period intervals followed by the sixth double period interval; the fifth command signal was very nearly 506 (505.996). If the ratio of the number of basic conveyor displacement units between steps 10 and 11 (307 in the example) divided by the assigned number of interpolation intervals (256) was exactly 1.200 then the pattern of every fifth interval being of two periods of duration would be realized throughout the 256 intervals instead of the "sixth and then every fifth thereafter" pattern defined by the ratio 1.199 as explained in more detail hereinafter.

On an overall basis, however, the 256 command signal intervals are generally equally spaced relative to the overall manipulator movement and duration of the program step. It should be understood that the command signals may be generated each scan cycle for each manipulator axis and the conveyor during the duration of the particular interpolation interval or once per interpolation interval during the first scan cycle. Further, although the command signals may be described as being spaced apart by a certain time period or generated upon a given condition, it should be understood that the transition to the next interpolation interval and the generation of the next successive command signal during each scan cycle of an interpolation interval or once perinterpolation interval is really being described. In this manner, 256 interpolation intervals of variable duration and variable positional relationships will have been generated to traverse 307 conveyor displacement units in a nearly constant velocity synchronized conveyor mode by means of the variable multiplier factor applied to the difference in the recorded conveyor positional data. Of the 256 interpolation intervals, $307-256=51$ interpolation intervals will be of a duration equal to two periods of the basic conveyor displacement unit and 201 will be of one period duration according to equation 10.

The above example describes a situation wherein the number of basic conveyor displacement units for the particular recorded step is greater than the highest value in the set of assignable effective interpolation intervals, 256 in the specific example. While this example describes a situation where the mathematics are relatively complex, it should be realized that many and possibly most of the recorded program steps will comprise a number of basic conveyor displacement units less than 256. In those cases, the difference in recorded conveyor data between successive program steps will be either equal to one of the binary multiples of 16 (one of the set of assigned number of effective interpolation intervals) or more likely statistically will be between two of the binary values. For example, the number of basic conveyor displacement units between recorded steps as calculated in the teach mode may be 20. Thus, the recorded number of the set of effective interpolation intervals will be a code corresponding to 16; the nearest lower binary multiple of 16 to that of the number of basic conveyor displacement units. The command signals for the conveyor for each of the scan cycles during the successive 16 interpolation intervals according to equation 10 will be $C_1=1$, $C_2=2$, $C_3=3$, $C_4=5$, $C_5=6$, $C_6=7$, $C_7=8$, $C_8=10$, $C_9=11$, $C_{10}=12$, $C_{11}=13$, $C_{12}=15$, $C_{13}=16$, $C_{14}=17$, $C_{15}=18$, $C_{16}=20$. The duration of the interpolation intervals corresponding to the command signals $C_4$, $C_8$, $C_{12}$ and $C_{16}$ (every fourth command signal) will be equal to two periods of the basic conveyor displacement unit while the remaining interpolation intervals corresponding to the command signals $C_1$, $C_2$, $C_3$, $C_5$, $C_6$, $C_7$, $C_9$, $C_{10}$, $C_{11}$, $C_{13}$, $C_{14}$ and $C_{15}$ have a duration of one period of the basic conveyor displacement unit. It should also be understood as described hereinabove that command signals corresponding to the six controlled axes are also generated either once each scan cycle throughout each interpolation interval or during the first scan cycle of each interpolation interval according to the recorded data of successive program steps for each of these axes as described by equation 10. The ratio R of the number of basic conveyor displacement units between successive steps to the assigned number of effective interpolation intervals is $20/16=1.25$ for the present example as compared to 1.19 for the previous example. If the difference in the conveyor data of two steps is 24 basic conveyor displacement units then the ratio would be $24/16=1.500$. Thus every other interpolation interval would be two periods in duration. The relationship identifying the duration of particular interpolation intervals in the sequence is defined by the ratio R or more directly by the fractional or decimal portion of the ratio R in excess of unity. For a ratio R equal to unity, the interpolation intervals are all of equal duration and "spacing" (one period of a basic displacement unit nominally). This ratio of 1 is realized whenever the number of basic conveyor displacement units is equal to one of the set of the predetermined assignable effective interpolation intervals, ie: 16, 32, 64, 128 or 256 in a specific embodiment.

The reciprocal of the excess of the ratio R over unity (the quantity $1/R-1$) defines which intervals will be of one period duration and which will be of two period duration since the quantity $1/(R-1)$ multiplied by increasing integers determines when the conveyor command signal skips or proceeds from one value to a value two displacement units greater, e.g.; from 505 to 507. For example the following ratios result in the following pattern of single and double interpolation intervals: $R=1.50$, every other interpolation interval is a double period interval; $R=1.333$, every third interval is a double interval; $R=1.250$, every fourth interval is a double interval and similarly for $R-1=1/5, 1/6, 1/7, 1/8, 1/9$ and $1/10$, every 5, 6, 7, 8, 9 and 10 interpolation intervals are of two period duration. This can be appreciated by observing that a two period duration interval is defined whenever the quantity R multiplied by $m$ skips an integer, i.e. whenever $R(m)$ increases by two for an increase in $m$ by one integer. For example, if $R=1.2$ ($R-1=0.2$) every fifth interpolation interval results in an increase by two in the product $R(m)$; $(1.2)5=6$ compared to $(1.2)(4)=4.8$ where the 0.8 is disregarded resulting in 4. This can also be stated as every $j$ th interval will be of double period duration when $j(R-1) \geq 1.0$; if $R-1=0.2$, then $j=5$ and every 5th interval will have a duration of two periods.

For values of the ratio R (number of basic conveyor displacement units between successive steps divided by the assigned number of effective interpolation intervals) between 1.5 and 2.0, the following examples identify the pattern of two periods and single period interpolation intervals: $(R-1) = \frac{2}{3}, \frac{3}{4}, 4/5, 5/6, 6/7, \frac{7}{8}, 8/9, 9/10$ and $10/11$, every third, fourth, fifth, sixth, seventh, eighth, ninth, tenth and eleventh intervals are of single period duration respectively and the remaining intervals are of double period duration. When the quantity $R-1$ is not a fraction of the type above, the pattern diviates from a simple relationship as above and the pattern alternates between every second and third interval being of double period duration, for example, if $R=89/64=1.39$. It should be understood that the mathematical accuracy of the specific circuitry utilized may also shift the pattern and that the pattern is really irrelevant as long as conveyor synchronism is achieved and the correct number of total interpolation intervals with corresponding command signals are generated to traverse the number of basic conveyor displacement units between successive program steps. It should also be understood that the conveyor command signals referred to hereinabove are utilized for comparison with the conveyor encoder to detect coincidence and maintain synchronism and are not utilized to "command" the conveyor in a control sense.

In accordance with the variable duration interpolation period unit of the present invention, a three bit interpolation date code is recorded in the memory 204 for the CP mode and read out in playback during the G1 scan period when the control information from the memory 204 indicates that the CP or $CP_W$ mode is to be employed instead of the PTP (C) mode for the program step. The recorded data bits, LN-1, LN-2 and LN-3 define the number of effective interpolation intervals which were calculated during the teach-assist mode in which the step is to be accomplished. The LN-1 to 3 code describing the effective interpolation intervals corresponds to a binary multiple of 16, i.e.: 16, 32, 64, 128 or 256 in a specific embodiment as determined by the projected number of displacement units of the conveyor for the recorded points as calculated. Thus, if the difference in recorded conveyor readings is 307 for two successive steps, the LN-1 to 3 code recorded corresponds to 256. The number of effective interpolation intervals recorded as a code represents the nearest binary multiple of 16 less than the number of conveyor displacement units or difference signal between the two steps with the specific set of possible intervals 16, 32, 64, 128 and 256.

The interpolation code, LN-1 to 3, is obtained from the memory data $MD_n$ by decoder unit 250 which outputs the decoded multiple of 16 signals 16, 32, 64, 128 or 256 on signal lines which are utilized to control the variable duration interpolation period CP step as will be explained in detail hereinafter.

The relative spacing between successive command signals is equal to the period of either one or two basic conveyor displacement units at the actual conveyor velocity in playback since the ratio of the number of basic conveyor displacement units for a given step to the assigned number of effective interpolation intervals is a number between one and two. This ratio is determined by the relationship of the possible alternatives of interpolation intervals which in the specific embodiment described are a set of five binary multiples of 16, i.e.: 16, 32, 64, 128 or 256. It should be understood that numerous other sets or groups of assigned intervals are also possible such as binary multiples of 4 or 8. Binary multiples are the most convenient, of course, since conventional digital circuitry is based on the binary system. Further, if the maximum number of basic conveyor displacement units to be traversed in a recorded step is greater than 511, an extended series of assigned intervals could be provided or a binary multiple of 32 set could be utilized. The number of alternative assigned interpolation intervals in the set varies the required LN-1 to 3 data code. The three data lines LN-1 to 3 provide a maximum of 8 possible values of assigned interpolation intervals and additional data lines may be provided for a greater number of alternative values.

Figure 11:
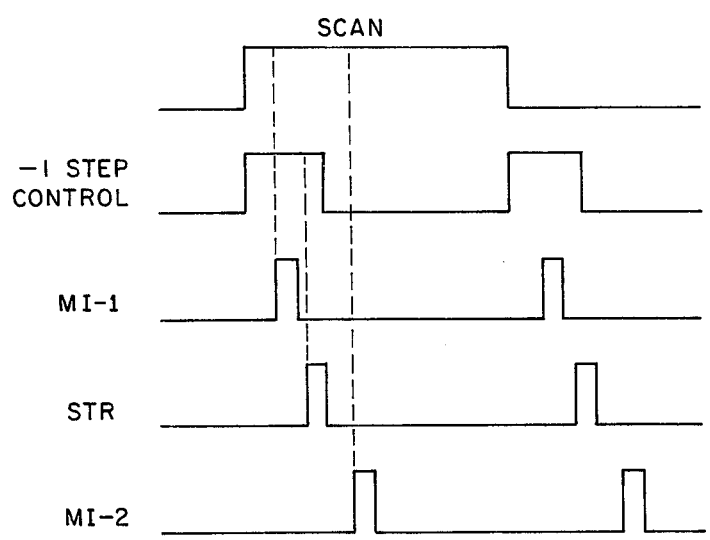
FIG. 11 is a diagrammatic representation of various waveforms occurring in the electronic circuitry of FIG. 5.

The positional multiplexed data $MD_n$ for the seven axes from memory 204 is presented to the variable duration interpolation period unit with the mode selector 206 being disabled from providing data directly to the comparator 208. The $MD_n$ data is supplied to a subtracter unit 252 and a minus one step register stage 254 which are each enabled by the CP signal. The combination of subtracter unit 252 and minus one step register 254 are effective to subtract the present step command signal, e.g. step 11, from the previous step command signal, e.g. step 10, for all seven axes and provide a data bus output $\Delta M$ from subtracter 252 that is the positional difference between the command signals for two successive program steps on a plurality of data lines for all seven axes in a multiplex arrangement. The minus one step register 254 recalls the data from the previous step 10 by means of a strobe pulse signal STR provided by the address and timing control circuitry 200. The strobe signal STR (FIG. 11) is derived from a first memory initiate signal MI-1 which is generated during the middle of a $-1$ step control signal. The $-1$ step control signal is generated at the beginning of each scan signal and is provided to the address counter within the overall address and timing control circuitry 200 to address the memory 204 on liner $AC_n$ to the −1 step point, step 10, for example, of the program. When the MI-1 signal is generated, the −1 step data is read out to the −1 step register 254, the data being stored upon the occurrence of the STR strobe signal which is delayed slightly from the MI-1 signal. After the end of the −1 step control signal, a second memory initiate signal MI-2 is generated to read out the current step data for the remainder of the particular scan signal Gi. The output ΔM thus provides a digital representation in a multiplexed format of the positional distance to move between program step 10 and program step 11 in each of the six controlled axes of the manipulator and the conveyor. The subtracter 252 also provides control signals on the PS and MS conductors 257 and 258, respectively, which represent the polarity or direction of the desired positional difference appearing on the output conductors ΔM of the unit 252.

The plus or minus control signals on the conductors 257 and 258 are supplied to a combiner unit 260 to which is also supplied the 15 bit output from the minus one step register 254 corresponding to the command signal for program step 10 which has just been completed. The positional difference signal, ΔM, to be moved during program step 11 is now divided by the predetermined effective interpolation factor, the binary multiple of 16 code defined by LN-1 to 3, and the resultant smaller divided increment is added to the program step 10 command signal so as to produce a first artificial command signal which is employed to move the manipulator arm an amount equal to this smaller increment.

More particularly, a multiplier/divider 262 is arranged to be controlled by a binary interpolation counter 264 so that the multiplier/divider will multiply the positional difference signal ΔM, such as the conveyor incremental difference 307 between steps 10 and 11, by a variable fraction equal to the accumulated interpolation counter state divided by the total number of effective interpolation intervals during successive counts of the binary counter 264. In this connection, it will be understood that the multiplier 262 actually multiplies by a predetermined fraction to provide the required factor in each of the interpolation intervals. This is accomplished by the $2^0$ through $2^7$ outputs of the counter 264, indicated generally as 263 being effective to control the multiplier to multiply by a different fraction for each interpolation interval to provide the factor m/N in equation (10). The counter 264 is preset to a count of one to provide a factor of one for the first effective interpolation interval command signal. This factor m/N is multiplied by the factor ΔM appearing at the input of the multiplier stage to provide the first term of equation (10), i.e.:

$$\left( \frac{MD_n[\text{step }(k)] - MD_n[\text{step }(k-1)]}{N} \right) m \quad (11)$$

at the output 266 of the multiplier 262. The number of intervals assigned to the step are provided to the multiplier on the data lines 251 of the decoder 250. The output 266 of multiplier 262 is connected to the combiner 260 which adds or subtracts (under the control of the PS and MS control lines) the first term of equation (10) identified as equation (11) to or from the minus one step positional data $MD_{N-1}$ indicated generally at 268 which is provided from register 254.

The overall combination of the subtracter unit 252, the minus one step register 254, the multiplier 262, the counter 264, and the combiner 260 is effective to perform the process described by equation (10) as m varies from 1 to N.

In accordance with the control of the interpolation counter 264, a coincidence signal is generated when the effective interpolation command signal $C_N$ for the conveyor during scan G2 equals the conveyor encoder output $E_n$. Thus, the interpolation counter 264 is advanced in count controlling the multipler 262 to supply the next interpolation factor and artificially generated command signal to the output $C_N$ of the combiner 260.

In the CP mode, the conveyor coincidence signal, the Q output of latch 232 is connected through a three input NAND gate 273 to a monostable multivibrator stage 274. The remaining two inputs of gate 273 are connected to the CP and GO signals. The mono stage 274 is triggered by the falling edge of the Q output of latch 232 and the falling edge of the GO scan signal to produce an advance pulse to the interpolation counter 264 on line 278 at the start of the scan cycle. Thus, upon coincidence, the next successive effective interpolation command signal is generated and the conveyor coincidence signal will again be developed to advance the counter 264 to generate the next in the series of N effective interpolation command signals. It should be remembered that while the conveyor coincidence signal is generated upon equality of the conveyor encoder signal and artificially generated conveyor command signal, the six encoder outputs of the controlled axes of the manipulator in the multiplex scanning cycles are also compared to the artificially generated command signals for each axis according to the same procedure described above and by equation (10).

In this manner, the manipulator arm 1004 is moved toward the charging effective interpolation commanded positional signals to perform the series of recorded steps along the moving workpiece 1002 on conveyor 1000 by the error signal $DE_R$ being applied through the D/A converter 210 and the servo control stage 212 to the servo valves 214. This method of moving the six controlled axes of the manipulator is similar to the PTP mode and is described in detail for the linear interpolation mode in the above referenced application Ser. No. 625,932.

The outputs $2^4$ through $2^8$, inclusive, of counter 264 are supplied to a plurality of comparison gates along with the outputs 16, 32, 64, 128 and 256 indicated generally as 251 to determine the completion of the (N-1)th command signal generation. The decoded outputs 251 define the number N of effective interpolation intervals assigned to the step as read out during G1 scan time on the lines LN-1 to 3. To this end, one of the 16, 32, 64, 128 and 256 outputs of decoder 250 is each connected to one input of a series of two input AND gates 290, 292, 294, 296 and 298, respectively. Similarly, one of the counter outputs $2^4$, $2^5$, $2^6$, $2^7$ and $2^8$ are each connected to the second input of the AND gates 290, 292, 294, 296 and 298, respectively. The outputs of the gates 290 through 298, inclusive, are connected to a five input NOR gate 300 whose output is connected through an inverter gate 301 to provide the LS signal, the last step or count of the series of interpolation intervals.

For example, if the programmed number of effective interpolation intervals is 256, the AND gate 298 upon the counter 264 producing 255 interpolation counts and being advanced to a state of 256 will develop a high logic level at its output to drive the output of the NOR gate 300 to a low level and the output of the inverter 301 to a high level to produce the LS signal. When an LS, last interpolation command signal is generated and the WSP signal switches to a high level to advance to the next program step, the WSP signal is also connected to trigger a monostable multivibrator stage 302 on the falling edge of WSP. The output of the stage 302 is connected to preset the interpolation counter 264 to a count of 1 for the next program step. The counter is preset to a one so that the first interpolation interval signal will provide a multiplier of 1/N to be multiplied by the difference signal $\Delta M$ and added to the initial recorded data for the previous step. In presetting the interpolation counter 264 to a count of 1 at the beginning of a CP step, the output pulse duration of stage 302 is longer or wider than the pulse duration of stage 274 to ensure that the presetting to a count of 1 overrides or takes precedence over the advance count provided by stage 274.

The LS, last interpolation interval, signal is also connected to one input of a two input NOR gate 304 with the second input connected to the PTP mode signal. The output of the gate 304 is connected through an inverter gate 306 to provide the mode select signal S to control the multiplexer stage 206. Accordingly, the signal S is effective to present $MD_n$ data to the comparator 208 whenever the PTP mode signal or PTP (C) mode signal is a high logic level or whenever an LS signal is detected in the CP mode to provide the final positional values of the present program step in the last interpolation interval.

Considering the timing relationships of the artificial command signals, it should also be noted that the effective interpolation command signal always leads or is equal in count to the conveyor encoder output even under the condition of specified maximum conveyor line speed. This is assured since the interpolation counter 264 is advanced by 1 count whenever the conveyor encoder equals the commanded signal. The only lag time, in the worst case situation, between the advancing of the interpolation counter versus the conveyor encoder position is the multiplex scan interval spacing between the end of a G2 time period of one scan cycle and the falling edge of the G8 scan period in the next successive scanning cycle. This represents a maximum time delay of 2.8 msec. for a 1.0 sec. multiplex scanning cycle duration. The 2.8 msec. delay results from the interpolation advance signal 278 occurring at the falling edge of G8 whereas the equality or coincidence of the conveyor encoder signal and command signal is detected during the G2 scan period of the previous scanning cycle. The critical relationships are defined by the lag time in synchronization of 2.8 msec. and the number of displacement units the conveyor moves during this period at a maximum worst case velocity of six inches per second, for example. As long as the commanded signal delay is less than the time in which the conveyor moves one encoder displacement unit, synchronization is maintained. Equality between these quantities takes place, with 1 encoder increment equal to 0.0234 inches, at a conveyor speed of approximately eight inches per second. In that case, the coincidence flip-flop 232 would be providing an almost continuous high output since a nearly continuous state of equality would occur. With these relationships and synchronization criteria, the various parameters such as scan cycle time and length of conveyor encoder increments can be controlled to assure proper performance. Further, the conveyor data read out and comparison may be repositioned at the G7 scan location of the multiplex scan cycle so that the synchronization lag time is reduced. In this manner, with the control count arrangement illustrated, a maximum line velocity of 13 inches per second can be tolerated.

In an alternative embodiment, several CP or $CP_W$ steps may be recorded during the teach assist phase corresponding to a single program step comrpising a combination of 16, 32, 64, 128 or 256 interpolation interval steps or other related number sets. In this embodiment the interpolation intervals are all equally spaced and equal to the duration of one period of the basic conveyor displacement unit. The combination of multiple CP binary 16 multiple steps is calculated in the teach assist phase as the closest combination greater than or equal to the number of basic conveyor displacement units calculated for the step. In the replay mode, the interpolation counter 264 is advanced upon the traverse of each basic conveyor displacement unit. This alternative embodiment is less desirable than the embodiment described above (variable duration interpolation interval) since it is an approximation technique and does not achieve optimum velocity and requires more recorded steps than the variable duration interpolation interval approach. Further increased storage and time per step are required. For example, the approximation combination approach would assign a 112 combination interpolation interval CP step (actually a 64 interval, a 32 interval and a 16 interval step would be recorded) in the teach phase to a calculated 97 to 112 basic conveyor displacement unit step. It should also be understood that the operator of the computer may record a particular programmed step as a multiple combination CP step of variable duration interpolation intervals. For example, for a taught and calculated projected traverse comprising 110 basic conveyor displacement units, a variable duration interpolation interval CP step of 64 interpolation intervals and a variable duration interpolation interval CP step of 32 interpolation intervals would be recorded. While this approach varies the relative spacing of the single period and double period interpolation intervals, it does not significantly affect the overall manipulator performance.

Figure 7:
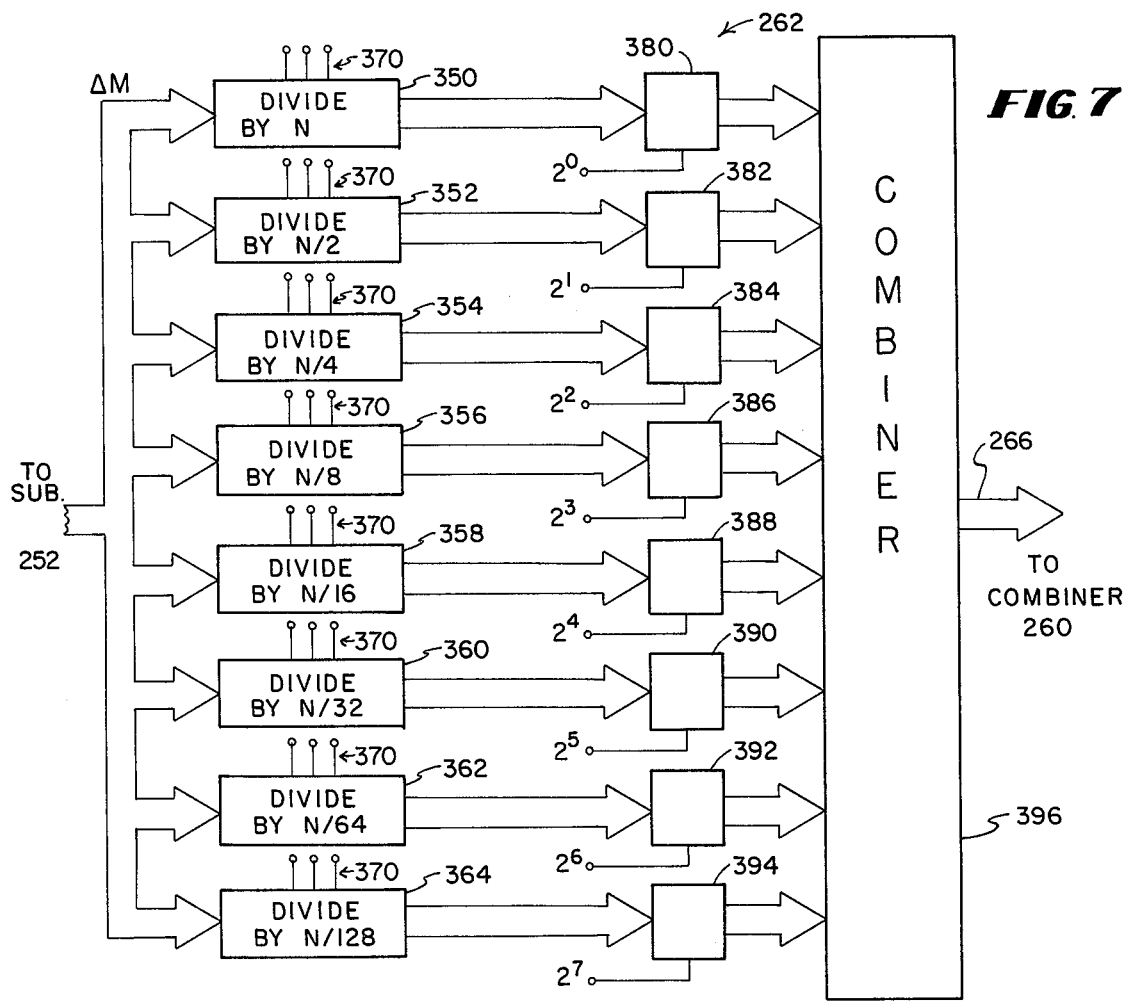
FIG. 7 is a logic and block diagram of the multiplier stage of the electronic control circuitry of FIG. 5.

The multiplier stage 262, referring now to FIG. 7, in one specific embodiment is implemented by a series of digital dividers which are each arranged to divide by different predetermined binary factors with the divider outputs being selectively enabled under the control of the interpolation counter 264 to combine the appropriate digitally divided results to effectively multiply the positional difference signal $\Delta M$ during the effective interpolation intervals by a series of fractions according to the formula $m/N$, where N is the number of effective interpolation intervals assigned to the step (binary multiple of 16) and $m$ varies from 1 to $N-1$ as will be explained in more detail hereinafter.

The digital divider stages 350 through 364 are conventional in design and may be implemented using Texas Instrument devices SN 7495, SN 7483, SN 7493 and SN 7474 similarly to the 4 bit binary multiplier or divider described in *Designing with TTL Integrated Circuits*, edited by Robert L. Morris, published by McGraw-Hill Book Company. The dividers 350 through 364 are programmable dividers and are capable in a specific embodiment of dividing a 12 bit number at the input, ΔM, by a programmed ratio. The dividers are each programmed to divide by a different predetermined ratio as controlled by the LN-1 to 3 lines indicated generally as 370. The lines LN-1 to 3, as discussed hereinbefore, contain a code defining which binary multiple of 16, i.e: 16, 32, 64, 128 or 256 is the recorded number of effective interpolation intervals calculated for specific CP program step in the teach-program mode. The divider 350 is programmed to divide by the number N corresponding to the number of effective interpolation intervals. In a specific example, if the LN-1 to 3 code specifies 256 interpolation intervals, the divider stage 350 will be programmed to divide by 256. Similarly the dividers 352 through 364 are programmed to divide by N/2, N/4, N/8, N/16, N/32, N/64 and N/128, respectively, which correspond to 128, 64, 32, 16, 8, 4 and 2, respectively, in the specific example. The outputs of the dividers then represent, respectively, the positional difference ΔM divided by the respective programmed division ratio or ΔM/256, ΔM/128, ΔM/64, ΔM/32, ΔM/16, ΔM/8, ΔM/4 and ΔM/2.

Each of the outputs of the dividers 350 through 364 is connected to one of a series of enabling gate arrays 380 through 394. The output of each divider is a multiple bit data bus and the gate arrays 380 through 394 include a logic gate (not shown) for each data line with each of the logic gates being enabled by a control lead input. The control inputs for the gate arrays 380 through 394 are the outputs $2^0$ through $2^7$, respectively, of the interpolation counter 264. The outputs of the gate arrays are each connected to an input of a combiner 396.

In operation, the gate array 380 is enabled by the $2^0$ output on the first effective interpolation count to input the factor ΔM/256 in the specific example to a combiner stage 396. Since the $2^1$ through $2^7$ outputs are zero, the other gate arrays 382 through 394 are not enabled and the only combiner input is the factor ΔM/256 which is provided at the combiner output 266 which is the input to the combiner 260 of the variable interpolation unit. The outputs of the gate arrays 380 through 394 are also in a multi-bit data bus format and the combiner 396 is implemented to combine the eight data bus inputs in a binary addition fashion. As the interpolation counter 264 is advanced in state throughout the number N of interpolation intervals, the various outputs $2^0$ through $2^7$ are activated in a conventional binary manner. For example, the outputs $2^0$, $2^2$, $2^4$, $2^5$, $2^6$ and $2^7$ are high and enable the gate arrays 380, 384, 388, 390, 392 and 394, respectively, on the 245th count in the series of 256 interpolation intervals. The output of the combiner 396 for the 245th count or interpolation interval with m = 245 is $$\frac{\Delta M \cdot 245}{256}.$$

In the case of a lower number of interpolation intervals such as 32, the dividers 360, 362 and 364 are not programmed to divide and in any case the gate arrays 390, 392 and 394 are not enabled since the interpolation counter never reaches a count beyond 32. The divider stages 350, 352, 354, 356 and 358 for a 32 interpolation interval step are programmed to divide by 32, 16, 8, 4 and 2, respectively. The enabling of the gate arrays when N = 32 is similar to the process described relative to the case where N = 256. For example, on the third count, the gate arrays 382 and 380 are enabled to provide the factors ΔM/32 and ΔM/16 to the combiner which provides the factor ΔM·3/32 at the output 266.

In accordance with another important aspect of the present invention concerning the control of the manipulator apparatus, a velocity mode constant is calculated and recorded in the teach mode for each CP mode step. The velocity mode constant $K_v$ is utilized by the control circuitry to generate fixed velocity command signals for each of the controlled axes of the manipulator apparatus in the replay mode. Thus, more accurate tracking can be obtained by the use of a velocity command signal in a feed-forward manner in combination with a closed positional loop system than would be possible with the positional loop alone. For example, if the velocity command signal can be utilized to drive each controlled axis to within ± 10% of the desired velocity, a 10 to 1 improvement in position error is achieved relative to the positional loop operating without the velocity command signal.

Figure 8:
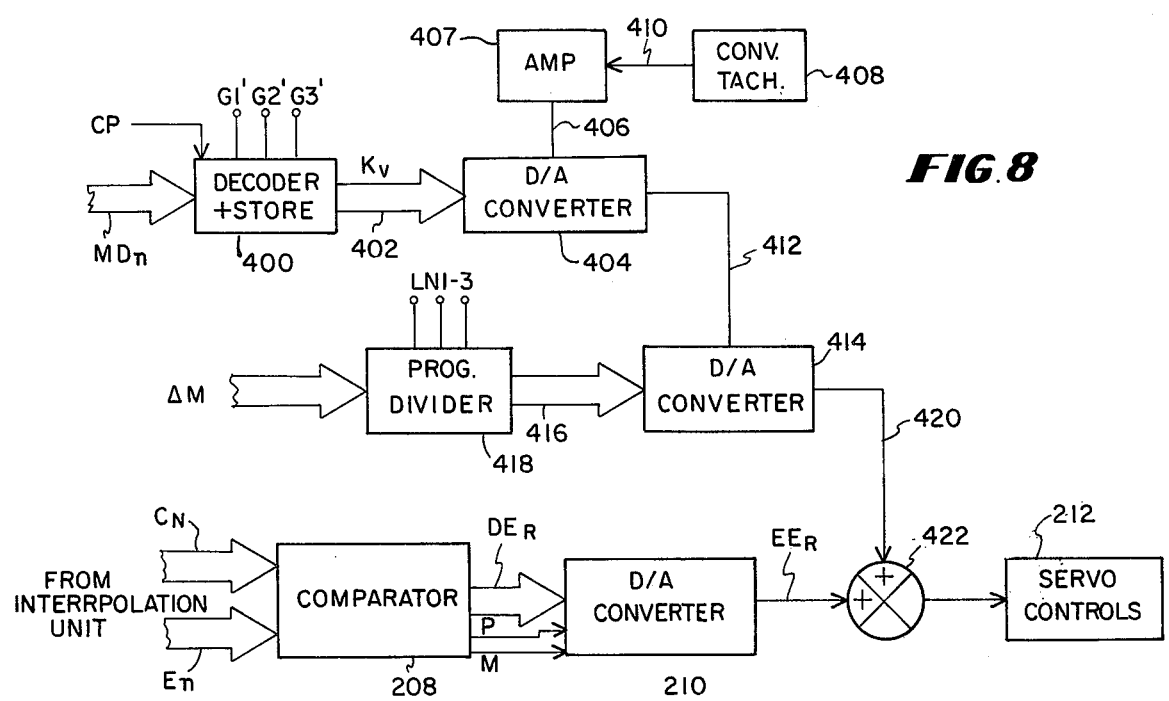
FIG. 8 is a logic and block diagram of a velocity controlled and positional controlled electronic control circuit utilized in conjunction with the control circuitry of FIG. 5.

The velocity mode constant $K_v$, referring to FIGS. 5 and 8, is recorded into memory 204 for each CP step after being calculated in the teach-assist mode. The digital velocity mode constant is calculated by the computer 224 during the teach function and recorded as a six bit signal in a specific embodiment that is inversely proportional to the distance to be traversed by the conveyor during the step. This distance corresponds to the time of each step at nominal conveyor velocity. The velocity mode constant $K_v$ is also, therefore, proportional to the velocity of each controlled axis of the manipulator relative to the nominal conveyor velocity when multiplied by the number of positional encoder bits to be traversed for each respective axis.

In the playback mode, the velocity mode constant is multiplied by the positional change in each axis for the step on a multiplex basis and the actual conveyor velocity as will be explained in detail hereinafter. The velocity commanded in each axis can be expressed as:

Velocity (axis) = $(K_v)$ $(\Delta M_{axis})$ (Velocity$_{conveyor}$)

The constant $K_v'$ is calculated in a preferred specific embodiment by dividing the number of effective interpolation intervals assigned to each step (for scaling purposes) by the number of basic displacement units of conveyor position to be traversed during the step. Thus, the velocity mode constant $K_v'$ in this specific preferred embodiment can be written as:

$$K_v' = \frac{\text{\# effective interps./step}}{\text{\# of displacement units/step}} = \text{(value between .5 and 1)}$$

The $K_v'$ constant is a value between 0.5 and 1 since the time of the effective interpolation intervals varies from 1 to 2 times that of the time to traverse a basic displacement unit of conveyor position. As the effective interpolation interval period increases, the relative velocity decreases.

The $K_v$ constant in a specific alternative embodiment may be calculated during playback rather than stored in memory. To accomplish this, the reciprocal of the difference between the conveyor data for successive steps is obtained and stored during the current step. This signal is then utilized in replay instead of the recorded $K_v$ constant as in the preferred embodiment.

While the velocity constant $K_v'$ in the preferred embodiment as recorded in memory includes a numerator equal to the number of assigned interpolation intervals, the $K_v$ constant in the alternate embodiment is recorded as the reciprocal of the number of basic conveyor displacement units to be traversed by the conveyor for the particular step. The $K_v'$ constant in the preferred embodiment includes the number of interpolation intervals as a numerator to facilitate the recording of the constant as a convenient number in the range of 0.5 to 1 since the number is recorded as digital bits representing $2^{-1}$, $2^{-2}$, $2^{-3}$, etc. In contrast, if the range of $K_v$ constant were recorded as the reciprocal of the number of displacement units, the recorded range would be between 1/16 and 1/512 in a specific embodiment which is a range sixteen times larger than 0.5 to 1, the range recorded in the preferred format. Also, the decoded velocity mode constant which is converted to an analog voltage in replay would have an undesirably wide range. Further, the preferred recording with the numerator being equal to the number of interpolation intervals allows for the scaling of the number of positional bits per axis (which is multiplied by the velocity mode constant in replay) to be in a range which is sixteen times smaller by the use of a programmable divider or shifter stage which is programmed to divide by a divisor equal to the number of assigned interpolation intervals divided by 16. It should be understood that the velocity mode constant could also be recorded in memory for each axis (utilizing extra memory capacity) as the number of bits in each axis to be traversed during the step divided by the number of conveyor displacement units.

In any event, the relative velocity mode constant $K_v'$ is read out of the memory 204 for each CP step from the $MD_n$ data bus and decoded and stored by a decoder and storage stage 400 to be presented in a binary format at the output 402 of the decoder stage 400 to a multiplying digital to analog (D/A) converter stage 404. The decoder stage 400 includes strobe signals G1', G2', and G3' as control inputs and the decoder and storage stage 400 in a specific embodiment may be included within the memory decoder and buffer stage 250. The G1', G2' and G3' strobe signals are narrow pulse signals generated in the middle of the second half of the G1, G2 and G3 scan signals respectively. The velocity mode constant (binary format) may be recorded in the basic data format at a number of spare or extra bit positions in the groups of data read out at particular multiplex scan intervals of the scan cycle. For example, one bit may be recorded in an extra bit position of the auxiliary data that is read out during the scan position G1 and two bits of the velocity signal may be recorded in two extra bit positions of the conveyor data that is read out during the scan position G2. Similarly, the remaining three bits of the velocity constant information may be recorded in an extra bit position of the shoulder positional data that is read out during the scan position G3. The decoder and storage stage 400 is effective to recover the six bits of information and assemble them to form the velocity constant from the multiplexed $MD_n$ data for each CP step.

The velocity mode constant signal 402 is provided to the digital input of the D/A converter 404 which is a multiplying converter as controlled by a variable reference line 406 at the output of amplifier stage 407. The amplifier 407 is driven by the output of a tachometer stage 408 which monitors the conveyor line speed and provides an analog voltage output 410 which is proportional to the instantaneous speed of the conveyor. Accordingly, the D/A converter 404 produces an analog output 412 which is proportional to the velocity constant $K_v'$ at 402 and which is also proportional to the instantaneous conveyor line velocity. In effect, the analog signal 412 is equal to the velocity constant $K_v'$ in an analog format multiplied by or adjusted for actual conveyor velocity. The analog signal 412 is connected to a multiplying digital to analog (D/A) converter stage 414 as the variable reference voltage. The digital input 416 of the D/A converter 414 is connected to the output of a programmable divider or binary shifter stage 418 which has the $\Delta M$ signal (the difference between successive command signal positional data for each axis in a multiplex format) as a digital input. The divider 418 is programmed to divide by 1, 2, 4, 8 or 16, respectively, according to the state of the LN1-3 code corresponding to the number of assigned effective interpolation intervals being 16, 32, 64, 128 or 256, respectively. The digital input $\Delta M$ is a 12 bit data bus signal on 12 data lines in a specific embodiment and the output 416 of the divider 418 is an 8 bit data bus signal on 8 data lines. The output 420 of the D/A converter 414 is proportional to the desired uniform velocity for each axis on a multiplex basis. The output 416 of the divider 418 corresponds to the number of positional bits for each axis on a multiplex basis to be traversed in 16 effective interpolation intervals and the division is performed for scaling purposes. It should also be noted that the signals 402 and 412 are also merely proportional to the velocity and may include constants or scaling factors.

The velocity command signal 420 of the D/A converter 414 is connected to one input of an analog summing amplifier 422 with a second summing input connected to the positional error signal output of the D/A converter 210 which is driven by comparator 208. The summing amplifier also includes an inverter stage controlled by the PS and MS signals of the subtractor unit 252 to determine the proper polarity of the velocity input 420. The output of the summing amplifier 422 is connected to control the servo controls 212 of the various axes of the manipulator. The relative signals and scaling factors are chosen so that the maximum velocity command at 420 is approximately 5 volts in a specific manipulator embodiment which corresponds to a maximum $\Delta M$ positional change of 4096 positional bits and a maximum tip velocity of approximately 20 inches per second.

The maximum steady-state positional error signal is expected to be approximately $\pm$ 0.5 volts and the gain of the loop is selected to be approximately 10. The maximum steady-state positional error signal is expected to be about 1/10 of the velocity command signal since the loop is to be predominantly controlled by the fixed velocity command signal to as great an extent as possible while still maintaining accurate positioning. If the fixed velocity command signal is capable of accurately controlling the desired velocity of the manipulator axes to approximately $\pm$ 10%, then an analog control signal (equal to the positional error multiplied by the loop gain) greater than or equal to 1/10 the magnitude of the maximum velocity command signal can correct for the $\pm$ 10% velocity error or track to the extent of approximately [1% $\times$ Vel. (bit/sec)] in bits of position error. The steady-state position error in $$\text{bits} = \frac{\text{Vel. Error (bits/sec)}}{\text{Position Loop gain (1/sec)}} = \frac{\text{[Vel. Error] bits}}{\text{[position gain]}}.$$

If there is a 10% velocity error at a 2000 bits/second velocity command and the position loop gain is 10, then the position error is $$\frac{(.10 \times 2000)}{10} = 20 \text{ bits of error.}$$

Thus, the use of a velocity command signal accurate to ± 10% has reduced the positional error by a factor of 10. It should be understood that other ratios of velocity command signal magnitude to position error signal magnitude are also possible. The only other variable in addition to manipulator response variations to commanded velocity signals is the variation in the conveyor line speed which is tracked out or accounted for by the conveyor coincidence function of the positional loop and the conveyor tachometer 408 varying the velocity command signal by means of the multiplying D/A converter 404.

The multiplexed fixed velocity command signals for each axis are then presented to the summing amplifier 422 in synchronism with the multiplexed positional signals for each axis. It should be realized that the complete fixed velocity command signals for each axis could be stored in memory if desired and read out directly instead of being generated in real time by means of the interpolation unit signals and the stored $K_v$ constant. The divider or shifter stage 418 may be implemented in accordance with conventional logic design principles using three signetics type number 8243 8-bit position scalar chips. Digital circuitry to monitor the conveyor line speed from the conveyor encoder digital output is also possible as an alternative to the conveyor tachometer stage 408.

Considering the velocity commanded open loop and closed positional loop control circuitry of FIGS. 5 and 8, the same position servo loop circuitry can be utilized for operation in the PTP and PTP(C) modes as is utilized for the CP mode with a velocity commanded open loop control arrangement. In the PTP and PTP(C) modes, the velocity command signal input 420 to the summing amplifier 422 is set to zero. Thus, the control circuitry functions as a point-to-point PTP positional closed loop system. Appropriate gain adjustment controls may be provided for the PTP and PTP(C) modes to provide differences in the signals applied to the servo valves.

Figure 10:
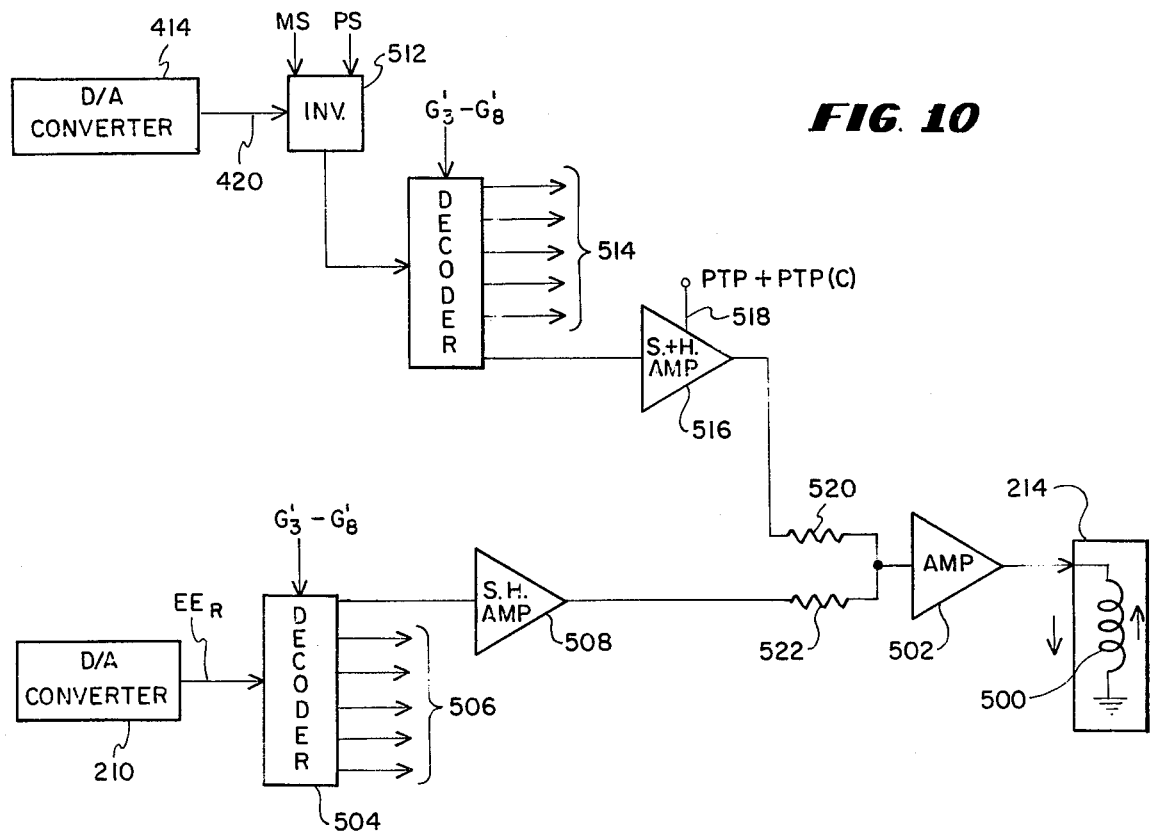
FIG. 10 is a more detailed logic and block diagram of portions of the control circuitry of FIG. 8.

The summing amplifier 422, servo controls 212, and servo valves 214 in one specific embodiment, referring to FIG. 10 utilize the bipolar analog control of a servo coil 500 for each axis connected between the ground reference and the output of an amplifier stage 502 for each controlled axis. The range of the voltage of the output of amplifier 502 is both positive and negative to achieve the proper direction of current flow in coil 500 and thus the proper direction of axis motion.

Considering the positional loop commands, the D/A converter 210 provides the multiplexed analog error voltage output $EE_R$ to a decoder stage 504 which properly distributes the signals in time on an output 506 for each controlled axis by means of control signals G3' to G8' which are generated in the middle of the second half of the G3 to G8 scan signals respectively. A sample and hold amplifier 508 is connected to each of the decoded analog error signal outputs 506. Similarly, the multiplexed analog velocity command signal 420 from the D/A converter 414 is provided to a decoder stage 510 through a selective inverter stage 512 which inverts the analog signal whenever the MS signal indicates a minus signal. The decoder 510 distributes the analog signals on an output 514 for each controlled axis by means of the control signals G3' to G8'. A sample and hold amplifier 516 is connected to each of the decoded analog velocity command signals 516 and outputs a zero command reference level whenever a control lead 518 is activated by a logic signal indicating a PTP or PTP(C) mode of operation. The output of each velocity command sample and hold amplifier 516 is connected through a summing resistor 520 to the input of amplifier 502 and the output of each position error sample and hold amplifier 508 is connected through a summing resistor 522 to the resistor 520 and the input of summing amplifier 502. The summing resistors 520 and 522 provide a composite analog signal at the input of amplifier 502 representing the sum of the velocity command and positional error command signals.

Figure 9:
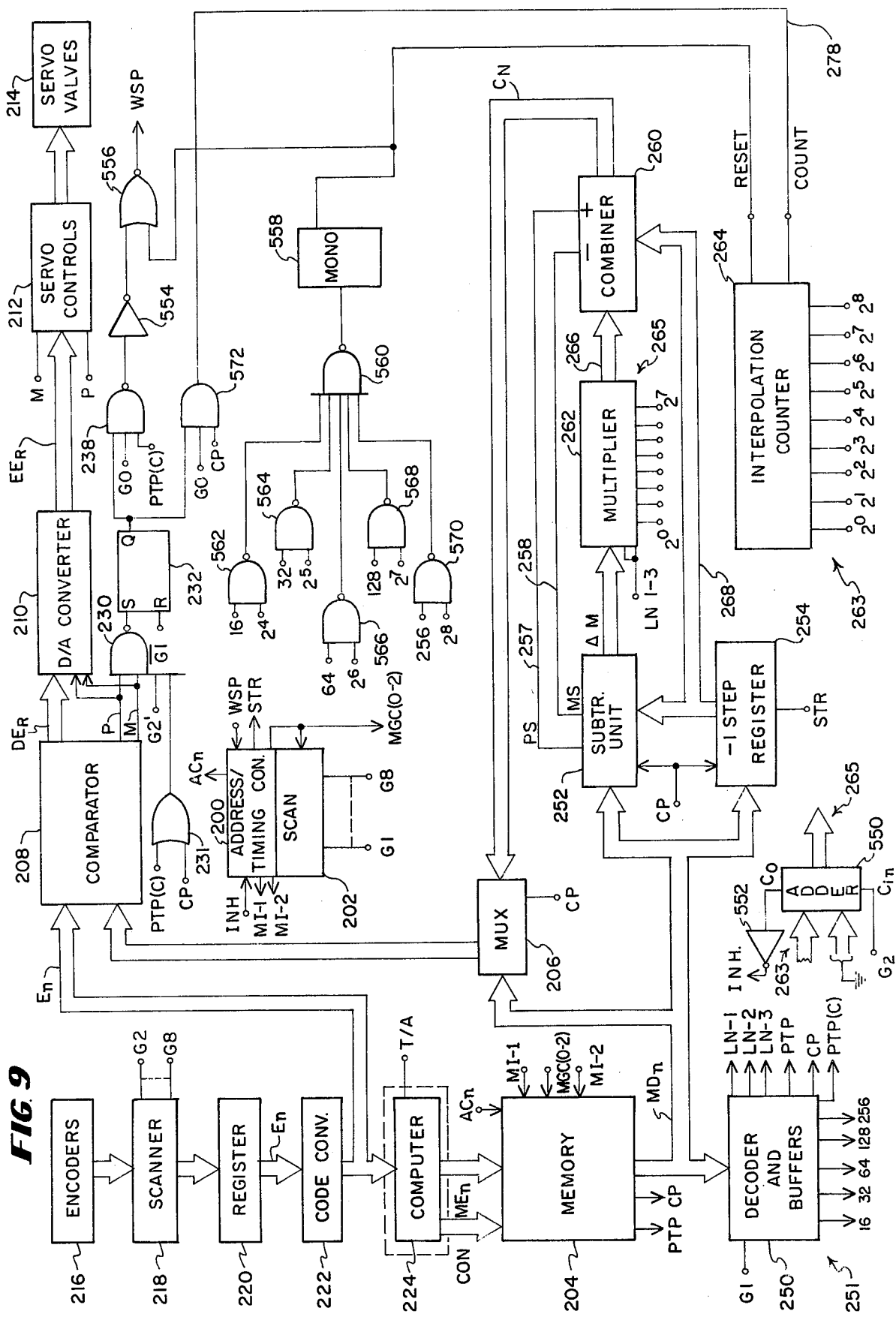
FIG. 9 is a logic and block diagram of the electronic control circuitry of the manipulator of FIG. 2 and illustrates a second embodiment of the variable duration interpolation period unit of the present invention.

In accordance with a further important aspect of the present invention concerning a preferred form of control circuitry for operation with a velocity commanded loop on an open loop basis, reference is made to FIG. 9 wherein identical reference numerals to those of FIG. 5 refer to similar stages and devices. In this specific embodiment, the control of the interpolation unit is arranged to supplement the operation of a velocity controlled loop as described in connection with FIG. 8 by providing positional error signals in a closed servo loop which are intended to provide a check on the accurately commanded velocity loop and correct for any positional inaccuracies rather than to provide positional control signals to control movement. To accomplish this, the positional interpolation command signals $C_x$(controlled axes) for the six controlled axes corresponding to the respective conveyor position $C_x$(conveyor) are generated when that conveyor position $C_x$ is reached rather than generating the command signals $C_{x+1}$ (controlled axes) for the six axes that correspond to an anticipated conveyor position $C_{x+1}$ when the position $C_x$ is reached by the conveyor as is the case in the embodiment described in conjunction with FIG. 5. The command signals $C_x$ for the six controlled axes and conveyor position $C_x$ represents the expected or projected position of the manipulator in the six controlled axes when the conveyor is at a position represented by the command signal $C_x$ for the conveyor.

The velocity command signal principally controls the motion of the manipulator axes and the positional signals from the interpolator unit are utilized for comparison with the current position of the manipulator axes to check the accuracy of the velocity commands and to verify that the present manipulator position is equal to the position projected for the corresponding present conveyor position. If the present manipulator position is not equal to the projected position then the positional signals will produce an error signal out of the comparator to correct for the positional inaccuracy. Since the positional loop comparison is utilized as a check on the positional accuracy when the conveyor reaches a certain position, the error signal from the comparator may be retained in the sample and hold amplifier 508 for the entire period of the interpolation interval so that the error signal is generated only once each interpolation interval. If this were not done, the positional error signal would detract from the accuracy achieved by the velocity control since the manipulator data is an accurate check only at the time at which the conveyor first reaches coincidence for the particular interpolation interval. The sampling of the error signal only once per interpolation interval, during the first scan cycle, may also be preferred in the closed positional control loop circuit as described in conjunction with FIG. 5 hereinabove when utilized in combination with the velocity loop described in conjunction with FIGS. 8 and 10. The sampling of the error signal during the first scan cycle of each interpolation interval may be accomplished by setting a flip-flop upon the occurrence of the interpolation counter advance signal 278 and the beginning of the scan cycle (occurrence of G1). The flip-flop is then reset upon the falling edge of the G8 scan signal. Thus, during the first scan cycle (G1-G8) after the beginning of an interpolation interval, the positional error signal EER from the converter 210 will be sampled by the sample and hold stages 508 which retain the sample throughout the interpolation interval. This sampling of the positional error once per interpolation interval eliminates a changing positional error signal (ripple effect) added to the velocity command signal troughout the interval. Even if the positional error is sampled once per scan cycle for the embodiment of FIG. 5, the servo system of the manipulator may not respond to the changing positional "ripple" signal due to the response time of practical servo systems. The generation of the command signals is described by the following relationship as compared to equation (10):

$$\text{command}_m{}^* = \frac{(MD_n[\text{step }(k)] - MD_n[\text{step }(k-l)])_m{}^*}{N} + MD_n[\text{step }(k-l)]$$

where $m^*$ takes on values of 1 to N for the conveyor during the G2 scan signal and values of 0 to N−1 for the six controlled manipulator axes. Thus, for the first interpolation command, $m^* = 1$ for the conveyor command, the command $C_1 = 501$ as in the example discussed previously and the commands for the other axes equal the data $MD_n[\text{step }(k-1)]$ wherein $m^*$ is 0. This offset in the value of $m^*$ being equal to one integer greater in the G2 scan signal period than the G3 to G8 scan signal periods is accomplished by a digital adder 550 which has one digital summing input connected to a logical zero and a second digital summing input connected to the outputs 263 of the interpolation counter 264. The carry-in, $C_{in}$ input of the adder 550 is connected to the G2 scan signal so as to add a digital one whenever the control circuitry is in the conveyor G2 scan signal. The output 265 of the adder 550 is connected to the inputs of the multiplier 262.

To generate the 256th command signal C256 of a 256 interpolation interval CP step for the conveyor during the G2 scan period an inhibit signal INH is generated to control the $AC_n$ address signal of the address and timing control stage 200 to address the memory 204 to provide the present step command data $MD_n[\text{step }(k)]$ to the −1 step register 254. This is necessary if a multiplier 262 is utilized without sufficient bit capacity to multiply by 256 when $m^*$ is 256. To accomplish the generation of the INH signal the carry-out, $C_o$, output of the adder 550 is connected through an inverter gate 552. The inhibit signal INH is effective to inhibit the recall of the $MD_n[\text{step }(k-1)]$ (−1 step) data and instead the present step command $MD_n[\text{step }(k)]$ data for the conveyor is provided to the −1 step register 254 so that the ΔM output of subtractor 252 is zero. Thus, the $MD_n[\text{step }(k)]$ data is provided to the combiner 260 and outputed to the comparator 208.

The operation of the interpolation unit and control circuitry is similar to that described above in connection with FIG. 5. However, the conveyor coincidence signal, Q output of latch 232, after being provided through gate 238 is connected through an inverter gate 554 to one input of a two input NOR gate 556. The output of the gate 556 is the WSP advance signal. The second input to gate 556 is connected to the output of a monostable multivibrator stage 558 which is triggered by the rising edge of the output of a five input NAND gate 560. The inputs of the gate 560 are connected to a series of five two input NAND gates 562, 564, 566, 568 and 570. One of the 16, 32, 64, 128 and 256 outputs of decoder 250 is each connected to one input of the gates 562 through 570. Similarly, one of the counter outputs $2^4$, $2^5$, $2^6$, $2^7$, and $2^8$ are each connected to one of the second inputs of the gates 562 through 570. Upon the occurrence of the $2^8$ output to gate 570, for example if the programmed number of interpolation intervals is 256, gate 570 will produce a low logic level to gate 560 which in turn produces a low to high logic level transition to trigger the mono stage 558. The output of the mono stage 558 is also connected to the reset line of the counter 264 and produces a reset pulse to the counter 264 to reset the state to zero and a WSP step advance pulse through gate 556.

The Q output of latch 232 is also connected to one input of a three input AND gate 572 having the GO and CP signals as inputs. The output of gate 572 upon conveyor coincidence in the CP mode and the occurrence of the GO signal provides a count pulse to the counter 264 to advance the state of the interpolation counter upon the falling edge of the pulse.

Figure 12:
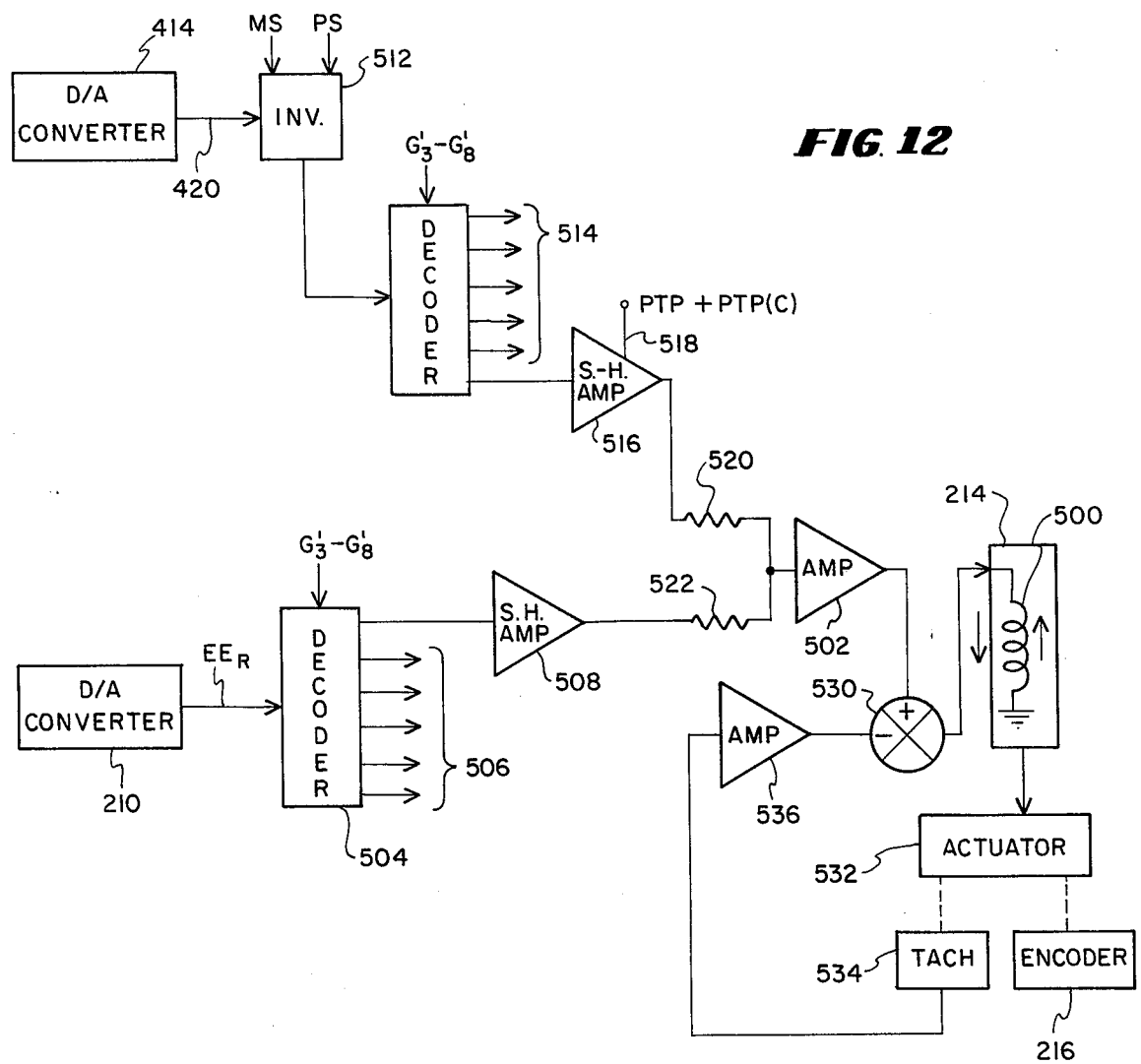
FIG. 12 is a logic and block diagram of portions of the control circuitry of FIG. 8 and illustrates the closed velocity loop control circuitry of the present invention.

In accordance with another important aspect of the present invention, and referring to FIG. 12, the control circuitry of FIGS. 5, 8, 9 and 10 is provided with closed loop velocity control to further improve positional tracking and reduce positional error. For example, in a specific embodiment if the velocity command signal is capable of accurately controlling the manipulator apparatus to approximately ± 10% of the desired velocity and a loop gain of 10 is provided, the velocity loop will have a steady state error of ± 1%. Further, the positional loop having a gain of 10 will reduce the steady state positional error to ± 0.1%. The steady state position error can be written in bits as:

$$\frac{[\text{Vel. Error}] \text{ bits}}{[\text{Position gain}] [\text{Vel. gain}]} .$$

If there is a 10% velocity error at a 2000 bits/second record velocity command and the gains of the position and velocity loops are each 10, the position error is $$\frac{(.10)(2000)}{(10)(10)} = 2 \text{ bits of error.}$$

The closed velocity loop results in an improvement by a factor of 10 over the open loop velocity command and closed positional loop described in conjunction with FIGS. 5, 8 and 9.

Considering now the detailed operation of the closed velocity loop and referring to FIG. 12, a subtractor 530 is provided for each manipulator axis having a summing input connected to the output of amplifier 502 of FIG. 10 which combines the velocity command signals and positional error signals (as described in detail in conjunction with FIG. 10). The output of the subtractor 530 is connected to drive the servo valve 214. The servo valve 214 for each particular axis controls an actuator device 532 which produces motion in response to current in the servo coil 500. As the actuator produces motion in the specific axis, the positional encoder 216 produces a digital output signal deecribing the changing position of the axis. A tachometer 534 is provided for each of the axes to measure the velocity of motion in each respective axis which produces an output proportional to the velocity. The output of the tachometer 534 is connected through an amplifier stage 536 to the subtracting input of the subtractor stage 530 to provide the negative feedback signal in the closed velocity loop. The remaining circuitry and operation of FIG. 12 is identical to similarly identified circuitry of FIG. 10.

While there has been illustrated and described a single embodiment of the present invention, it will be apparant that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator, the combination of, a manipulator arm movable in a plurality of axes, a continuously moving conveyor positioned adjacent said programmed manipulator, memory storage means having stored therein a plurality of digital command signals at least some of which correspond to the program step position to which said arm is to be moved, one of said plurality of digital command signals including a digital representation of said conveyor position, one of said command signals for at least one program step including a continuous path mode signal, encoder means for each of said axes and said moving conveyor operative to develop position signals corresponding to the actual position of said arm in said plurality of axes and the actual position of said moving conveyor, address means for causing said stored command signals to appear at the output of said memory means in a predetermined sequence, means operative in the absence of said continuous path mode signal for moving said arm to the position represented by said stored command signals, means responsive to said continuous path mode signal for developing a digital signal equal to the difference between a command signal for a program step which includes said continuous path mode signal and the preceding command signal, means for dividing said difference signal into a predetermined number of increments according to said stored digital command signals at a program step which includes said continuous path mode signal, means for producing a series of artificial interpolation command signals equal in number to said predetermined number of increments which differ from said preceding command signals by said increments, means utilizing said artificial interpolation command signals to move said arm in a substantially continuous path, means for detecting the occurrence of a predetermined state of equality between said conveyor positional signal and said artificial conveyor command signal, and means responsive to said detecting means for developing an advance signal operative to control said dividing means to generate said predetermined number of increments.

2. In a programmable manipulator, the combination of, a manipulator arm movable in a plurality of axes, a continuously moving conveyor positioned adjacent said programmed manipulator, memory storage means having stored therein a plurality of digital command signals at least some of which correspond to the program step position to which said arm is to be moved, one of said plurality of digital command signals including a digital representation of said conveyor position, one of said command signals for at least one program step including a mode signal, encoder means for each of said axes and said moving conveyor operative to develop position signals corresponding to the actual position of said arm in said plurality of axes and the actual position of said moving conveyor, address means for causing said stored command signals to appear at the output of said memory means in a predetermined sequence, means for moving said arm to the position represented by said stored command signals, means responsive to said mode signal for developing a digital signal equal to the difference between a command signal for a program step which includes said mode signal and the preceding command signal, means for dividing said difference signal into a predetermined number of increments according to said stored digital command signals at a program step which includes said mode signal, means for producing a series of artificial command signals equal in number to said predetermined number of increments which differ from said preceding command signal by said increments, means for detecting the occurrence of the equality of said conveyor positional signal and said artificial conveyor command signal, and programmable counter means responsive to said detecting means for controlling the rate at which said series of artificial command signals are produced.

3. In a programmable manipulator, the combination of:
  a manipulator arm movable in a plurality of axis;
  a continuously moving conveyor positioned adjacent said programmed manipulator;
  memory storage means having stored therein a plurality of digital command signals corresponding to different positions of said arm in said axes and different positions of said moving conveyor, at least one of said command signals including a variable interpolation mode signal;
  encoder means for each of said axes and operative to develop digital position signals corresponding to the actual position of said arm in said plurality of axes;
  conveyor encoder means for said moving conveyor and operative to develop a digital position signal corresponding to the actual position of said conveyor;
  address means for causing said stored command signals to appear at the output of said memory means in a predetermined sequence;
  means operative in the absence of said variable interpolation mode signal for moving said arm to the position represented by said stored command signals;
  means responsive to said variable interpolation mode signal for developing a digital signal equal to the difference between a command signal which includes said variable interpolation mode signal and the preceding command signals;
  means for producing a predetermined number of artificial command signals comprising means for dividing said difference signal into a number of increments equal to said predetermined number of artificial command signals, means for multiplying each of said increments by a variable integer increasing by one with each successive one of said series of artificial command signals, means for combining said series of multiplied increment products with said preceding command signal to produce said series of artificial command signals; and means utilizing said artificial command signals to move said arm at a substantially constant velocity.

4. The combination of claim 3 wherein said means for moving said arm further comprises means common to said axes for comparing said digital position signals of said arm in said axes and said conveyor with said artificial command signals in said variable interpolation mode and wherein said dividing means further includes counter means responsive to said comparing means and advanced by the coincidence of each of said artificial command signals and said moving conveyor encoder means for controlling the generation of successive artificial command signals.

5. The combination of claim 4 wherein said stored command signals include coded data representing a preselected number of effective interpolation intervals equal to said number of artificial command signals, said difference signal including a digital representation for each of said axes and said conveyor representative of a number of conveyor encoder basic positional displacement units greater than or equal to said number of artificial command signals.

6. The combination of claim 5 wherein said multiplied increment products each include one or more positional conveyor encoder displacement units for said conveyor portion of said command signal.

7. The combination of claim 6 wherein said counter means is reset to a predetermined state upon generation of said preselected number of artificial command signals.

8. The combination of claim 6 wherein said preselected number of effective interpolator intervals of said stored command signal is a binary multiple of 16.

9. The combination of claim 4 wherein said comparing means sequentially compares different artificial command and position signal combinations corresponding to different ones of said axes and said conveyor during different periods in a repetitive multiplex scanning cycle.

10. The combination of claim 3 wherein said difference signal developing means and said artificial command signal producing means sequentially produce signals corresponding to different ones of said axes and said conveyor during different periods in a repetitive multiplex scanning cycle.

11. The combination of claim 10 wherein said artificial command signal is maintained for more than one repetitive multiplex scanning cycle.

12. In a programmable manipulator, the combination of:
a manipulator arm movable in a plurality of axes;
memory storage means having stored therein a plurality of digital command signals at least some of which correspond to the program step position to which said arm is to be moved, one of said plurality of digital command signals corresponding to a digital representation of a reference point on a reference axis which is different from said plurality of manipulator arm axes;
encoder means for each of said arm axes operative to develop position signals corresponding to the actual position of said arm in said plurality of axes;
encoder means for said reference axis operative to develop position signals corresponding to a predetermined reference point along said reference axis;
address means for causing said stored command signals in playback to appear at the output of said memory means in a predetermined sequence;
means for moving said arm to the position represented by said stored command signals;
means for developing a digital signal equal to the difference between command signals of successive program steps; and
means responsive to said difference signal for generating artificial command signals equal in number to a predetermined number according to one of said stored digital command signals, said artificial command signals being generated with a variable duration period as defined by said predetermined number, said artificial command signal generating means including means for detecting the occurrence of a predetermined state of equality between said reference point positional signal and said artificial reference point command signal, said detecting means controlling the generation of said artificial command signals by said command signal generating means.

13. In a programmable manipulator the combination of, a manipulator arm, means for moving said arm in a plurality of different axes, a continously moving conveyor positioned adjacent said programmed manipulator, memory storage means for storing digital representations corresponding to different positions of said arm in said axes and different positions of said moving conveyor, encoder means for each of said axes and operative to develop position signals corresponding to the actual position of said arm in said plurality of axes, means for storing said position signals in said memory storage means during an initial teaching operation with a static conveyor, means controlled in part by said encoder means for calculating new digital representations which are different from said manipulator arm position signals and correspond to desired new positions of said arm representing said desired initial teaching positions relative to said static conveyor, said means for storing said calculated digital representations in said memory storage means so that said stored digital representations may also act as command signals to control movement of said arm during playback.

14. The method of programming a manipulator provided with an arm which is movable in a plurality of axes and having encoder means for said axes operative to develop position signals corresponding to the actual position of said arm in a plurality of axes to perform a series of operations on a workpiece while the workpiece is continuously moving along a predetermined path, which comprises the steps of:
moving said arm during an initial teaching operation to different positions of the static workpiece;
storing said developed position signals corresponding to said positions of said teaching operation;
calculating digital representations utilizing said position signals which are different from said positions in said teaching operation and correspond to desired new positions of said arm representing said initial teaching positions relative to said static workpiece; and storing said calculated digital representations in a memory for use in controlling movement of said arm during playback with a continuously movable workpiece in accordance with said stored calculated digital representations.

15. The method of claim 14 wherein said calculating step further comprises the steps of:
converting said position signals corresponding to different angular positions of said arm in said plurality of axes for successive taught steps to Cartesian coordinates of the free end of said arm;
translating said resulting Cartesian coordinates to account for the projected movement of said workpiece in terms of positional displacement units along said predetermined path of said workpiece during the projected elasped time for said arm to traverse the distance between successive taught positions on said workpiece while it is moving at a nominal rate, said translated coordinates corresponding to the new position of said arm and the same position relative to the static workpiece when said workpiece is moving; and
reconverting said translated Cartesian coordinates defining said new position into said desired new position signals corresponding to the angular position of said arm about said plurality of axes.

16. The method of claim 15 wherein said translating step is accomplished by the steps of:
calculating the projected time interval $T_{1-2}$ for the arm to traverse the distance between successive taught points $P_{1s}$ and $P_{2s}$ on the workpiece at a projected arm velocity of $\dot{S}$ when the workpiece is moving at a projected velocity of $\dot{Z}_L$, and
modifying the Cartesian coordinates of $P_{2s}$ by a quantity which is defined by a first factor equal to the accumulated program position, $\Sigma D_1$, up to program step 1 corresponding to $P_{1s}$ in terms of a number of basic displacement units of workpiece position and the distance $D_{1-2}$ traversed by the workpiece during movement of the arm between $P_{1s}$ and $P_{2s}$ in terms of a number of basic displacement units of workpiece position.

17. The method of claim 16 wherein said $T_{1-2}$ calculating step is accomplished by the steps of:
defining the positional vector $\Delta S_{1-2}$ representing the distance between taught point $P_{1M1}$ and point $P_{2M2}$, where $P_{1M1}$ is the projected position of $P_{1s}$ at a first program step 1 position $\Sigma D_1$ and $P_{2M2}$ is the projected position of $P_{2s}$ at a second successive program step 2 position $\Sigma D_2$, said vector $\Sigma S_{1-2}$ defined by summing the positional vectors $\Delta S_s$ which is the positional change between said points $P_{1s}$ and $P_{2s}$ and the positional vector $\Delta Z_{1-2}$ which is the distance traversed by the workpiece at the projected velocity $\dot{Z}_L$ where $\Delta Z_{1-2}$ equals the product of $\dot{Z}_L$ and $T_{1-2}$,
additionally defining the positional vector $\Delta S_{1-2}$ in a second manner by the product of projected arm velocity $\dot{S}$ and $T_{1-2}$, and
solving for $T_{1-2}$ by equating the first and second defined quantities.

18. The method of claim 15 wherein said translating step further comprises the steps of:
calculating the positional vector $\Delta S_{1-2}$ in Cartesian coordinates defining the distance between a first taught point $P_{1M1}$ which is the projected point of $P_{1s}$ at a first program step 1 position relative to the workpiece position and a second point $P_{2M2}$ which is the projected position of the workpiece when said arm is moved between teach points $P_{1s}$ and $P_{2s}$ at a projected nominal velocity $\dot{Z}_L$, said positional vector $\Delta S_{1-2}$ calculated by summing the positional vector $\Delta S_s$, defining the vectorial positional change between said $P_{1s}$ and $P_{2s}$ taught points and the positional vector $\Delta Z_{1-2}$ which is the distance traveled by the workpiece at the projected workpiece velocity $\dot{Z}_L$, the term $\Delta Z_{1-2}$ defined by $\dot{Z}_L$ multiplied by the time $T_{1-2}$ to traverse the distance from points $P_1$ to $P_2$ with the workpiece moving, said positional vector $\Delta S_{1-2}$ also being defined by the projected velocity of the arm $\dot{S}$ multiplied by the time $T_{1-2}$ to traverse from points $P_1$ to $P_2$ with the workpiece moving, said quantity $T_{1-2}$ solved from this relationship to define the term $\Delta S_{1-2}$, and modifying the Cartesian coordinates of $P_{2s}$ by a factor of $\Sigma D_2$ which is equal to the sum of the factors $\Sigma D_1$ and $D_{1-2}$, where $\Sigma D_1$ is the accumulated projected position of the workpiece from a reference point and $D_{1-2}$ is the distance defined by the product $T_{1-2}$ and $\dot{Z}_L$.

19. In a programmable manipulator, the combination of:
a manipulator arm movable in a plurality of axes;
a continously moving conveyor positioned adjacent said programmed manipulator;
memory storage means having stored therein a plurality of digital command signals corresponding to the program step position to which said arm is to be moved, one of said plurality of digital command signals including a digital representation of said conveyor position, at least one of said command signals including a variable interpolation mode signal;
encoder means for each of said axes and said moving conveyor operative to develop position signals corresponding to the actual position of said arm in said plurality of axes and the actual position of said moving conveyor;
address means for causing said stored command signals to appear at the output of said memory means in a predetermined sequence;
means operative in the absence of said variable interpolation mode signal for moving said arm to the position represented by said stored command signals;
means responsive to said variable interpolation mode signal for developing a digital signal equal to the difference between a command signal for a program step which includes said variable interpolation mode signal and the preceding command signal;
means for producing a predetermined number of interpolation command signals according to a code in said stored digital command signals, said interpolation command signal producing means comprising a multiplier responsive to a control input and arranged to multiply said difference signal by a series of fractions according to said control input, the denominator of said fraction being equal to said predetermined number of interpolation command signals, and the numerator being a variable integer increasing by one with each successive one of said series of interpolation command signals, and means for combining said series of products of multiplied difference signals and fractions with said preceding command signal to produce said series of interpolation command signals;

means for detecting the occurrence of a predetermined state of equality of said conveyor encoder positional signal and said interpolation command signal; and means responsive to said detecting means for developing a control signal connected to said control input of said multiplier.

20. The combination of claim 19 wherein said multiplier comprises a plurality of programmable dividers, each of said dividers having a dividend input connected to said digital difference signal and a divisor input equal to said predetermined number of interpolation command signals divided by a different power of two starting with $2^0$ and increasing by one for each successive divider, the number of said dividers being equal to the number of binary digits in said predetermined number of interpolation command signals, a combiner and an enabling means responsive to said control signal and being connected to each of said quotient outputs of said dividers for selectively connecting said quotient output of each of said dividers to an input of said combiner, the output of said combiner producing said series of products of multiplied difference signals and fractions connected to said artificial command signal combining means.

21. The combination of claim 20 wherein said control signal developing means comprises a digital counter which is advanced in count by said detecting means and wherein said control signal is the binary state output of said counter and said counter produces a number of output states equal to the number of interpolation command signals on a plurality of binary lines, each of said enabling means being respectively connected to the binary line which represents the binary state output of said counter equal to the power of two in the divisor of the divider being controlled by said respective enabling means.

22. In a programmable manipulator, the combination of:

a manipulator arm movable in a plurality of axes;

a continuously moving conveyor positioned adjacent said programmed manipulator;

memory storage means having stored therein a plurality of digital command signals at least some of which correspond to the program step position to which said arm is to be moved, one of said plurality of digital command signals including a digital representation of said conveyor position, one of said command signals for at least one program step including a velocity mode constant;

encoder means for each of said axes and said moving conveyor operative to develop position signals corresponding to the actual position of said arm in said plurality of axes and the actual position of said moving conveyor;

address means for causing said stored command signals to appear at the output of said memory in a predetermined sequence;

means for moving said arm to the position represented by applied command signals;

means responsive to said velocity mode constant for developing a digital signal equal to the difference between a command signal which includes said velocity mode constant and the preceding command signal;

means for dividing said difference signal into a predetermined number of increments according to said stored digital command signals;

means for producing a series of artificial interpolation command signals equal in number to said predetermined number of increments which differ from said preceding command signals by said increments;

means common to said plurality of axes and said conveyor for comparing said digital position signals of said arm in said plurality of axes and said conveyor with said artificial interpolation command signals;

means responsive to said stored velocity mode constant and said difference signal for producing a velocity control signal by multiplying said velocity mode constant and said difference signal; and means for combining said velocity control signal and the output of said comparing means to produce an error loop control signal applied to said moving means.

23. The combination of claim 22 wherein said velocity control signal means further comprises means for adjusting said velocity control signal for changes in the velocity of said conveyor.

24. The combination of claim 22 wherein said velocity control means further comprises means for converting said velocity control constant and said difference signal to an analog velocity control signal, said converting means comprising a first multiplying digital to analog converter having said stored velocity mode constant as a digital input and a multiplying reference input that is proportional to said moving conveyor velocity and a second multiplying digital to analog converter having a signal proportional to said difference signal as a digital input and the analog output of said first digital to analog converter as a multiplying reference input, the output of said second digital to analog converter generating said velocity control signal.

25. The combination of claim 24 wherein said comparing means further comprises a third digital to analog converter to produce an analog positional error signal.

26. The combination of claim 25 wherein said velocity control signal is approximately an order of magnitude larger than said positional error signal, said velocity mode constant is calculated in a teach phase with a stationary conveyor and utilized in replay to drive said manipulator at a substantially constant velocity and in synchronism with said moving conveyor, and said positional error signal operating on a closed servo loop basis to provide correction to said manipulator arm position with respect to said moving conveyor.

27. The combination of claim 22 wherein said comparing means sequentially compares different artificial command and position signal combinations corresponding to different periods in a repetitive multiplex scanning cycle.

28. The combination of claim 22 wherein said difference signal developing means and said artificial interpolation command signal producing means sequentially produce signals corresponding to different ones of said axes and said conveyor during different periods in a repetitive multiplex scanning cycle.

29. The combination of claim 22 wherein said artificial interpolation command signal producing means further comprises means responsive to said comparing means for controlling the successive generation of said artificial interpolation command signals upon coincidence of each of said artificial interpolation command signals and said conveyor encoder means position signals.

30. The combination of claim 29 where said stored command signals include coded data representing a preselected number of effective interpolation command signals equal to said number of artificial interpolation command signals, said difference signal including a digital representation for each of said axes and said conveyor, said digital conveyor representation being representative of a number of basic positional displacement units greater than or equal to said number of artificial interpolation command signals.

31. The combination of claim 30 wherein said multiplied increment products each include one or more positional conveyor displacement units for said conveyor portion of said command signal.

32. The combination of claim 22 wherein said stored velocity mode constant is equal to the predetermined number of increments divided by the number of conveyor encoder basic displacement units in said difference signal.

33. The combination of claim 24 wherein said second multiplying digital to analog converter sequentially produces signals corresponding to different ones of said axes during different periods in a repetitive multiplex scanning cycle.

34. The combination of claim 22 wherein said stored velocity mode constant is equal to the reciprocal of the number of conveyor encoder basic displacement units in said difference signal.

35. The combination of claim 22 wherein said stored velocity mode constant is a digital representation of the relative velocity of said manipulator arm in said plurality of axes relative to the velocity of said moving conveyor.

36. The combination of claim 22 wherein said stored velocity mode constant is a digital representation of the inverse of the relative time to complete the respective step at nominal conveyor velocity.

37. The combination of claim 24 wherein said digital input to said second multiplying digital to analog converter is equal to said difference signal.

38. The combination of claim 24 wherein said velocity control signal means further comprises second means for dividing said difference signal by a divisor equal to said predetermined number of increments divided by 16 and the digital input to said second multiplying digital to analog converter is equal to the output of said second dividing means.

39. A digital multiplier responsive to a control input and arranged to multiply a first digital number by a series of fractions according to said control input, said multiplier comprising:
a plurality of programmable dividers, each of said dividers having a dividend input connected to said first digital number and a divisor input connected to a predetermined digital number divided by a different power of two starting with $2^0$ and increasing by one for each successive divider, the number of said dividers being equal to the number of binary digits in said predetermined number,
a combiner, and
an enabling means responsive to said control signal and being connected to each of said quotient outputs of said dividers for selectively connecting said quotient output of each of said dividers to an input of said combiner, the denominator of said series of fractions being equal to said predetermined number and the numerator being a variable integer increasing by one with each successive one of said series of integers in said predetermined number, each of said enabling means having an input representing a binary digit in said predetermined number.

40. The multiplier of claim 39 wherein the input of each of said enabling means is respectively connected to the binary state of said predetermined number equal to the power of two in the divisor of the divider being controlled by said respective enabling means.

41. In a programmable manipulator arranged adjacent a workpiece moving along a predetermined path to perform a series of predetermined operations relative to the workpiece the combination of:
a manipulator arm movable in a plurality of axes;
memory storage means having stored therein a plurality of digital command signals corresponding to the program step position to which said arm is to be moved, at least one of said plurality of digital command signals including a velocity mode constant comprising a digital representation proportional to the reciprocal of the distance to be traversed between successive program steps by the workpiece;
address means for causing said stored command signals to appear at the output of said memory means in a predetermined sequence;
means for developing a digital signal equal to the difference between command signals of successive program steps;
means responsive to said stored velocity mode constant, the workpiece velocity and said difference signal for producing a velocity control signal, said velocity control signal producing means comprising means for multiplying said velocity mode constant and said difference signal; and
means responsive to said velocity control signal for moving said arm.

42. The combination of claim 41 wherein said velocity control signal producing means further comprises means for adjusting said velocity control signal for changes in the velocity of said workpiece relative to a nominal velocity.

43. The combination of claim 41 wherein said multiplying means comprises a first multiplying digital to analog converter having said stored velocity mode constant as a digital input and a multiplying reference input that is proportional to said moving workpiece velocity and a second multiplying digital to analog converter having a signal proportional to said difference signal as a digital input and the analog output of said first digital to analog converter as a multiplying reference input, the output of said second digital to analog converter generating said velocity control signal.

44. The combination of claim 41 wherein said difference signal developing means and said velocity control signal producing means sequentially product signals corresponding to different ones of said axes during different periods in a repetitive multiplex scanning cycle.

45. The combination of claim 43 wherein said second multiplying digital to analog converter sequentially produces signals corresponding to different ones of said axes during different periods in a repetitive multiplex scanning cycle.

46. In a programmable manipulator arranged adjacent a workpiece moving along a predetermined path to perform a series of predetermined operations relative to the workpiece, the combination of:

a manipulator arm movable in a plurality of axes;

memory storage means having stored therein a plurality of command signals corresponding to the program step position to which said arm is to be moved, at least one of said plurality of digital command signals including a velocity mode constant comprising a digital representation proportional to the reciprocal of the relative time for the workpiece to traverse a predetermined distance at a projected nominal velocity;

address means for causing said stored command signals to appear at the output of said memory means in a predetermined sequence;

means for developing a digital signal equal to the difference between command signals of successive program steps;

means responsive to said stored velocity mode constant, said workpiece velocity and said difference signal for producing a velocity control signal, said velocity control signal producing means comprising means for multiplying said velocity mode constant and said difference signal; and means responsive to said velocity control signal for moving said arm.

47. The combination of claim 46 wherein said velocity control signal producing means further comprises means for adjusting said velocity control signal for changes in the velocity of said workpiece along said reference axis relative to said projected nominal velocity.

48. The combination of claim 46 wherein said multiplying means comprises a first multiplying digital to analog converter having said stored velocity mode constant as a digital input and a multiplying reference input that is proportional to said moving workpiece velocity and a second multiplying digital to analog converter having a signal proportional to said difference signal as a digital input and the analog output of said first digital to analog converter as a multiplying reference input, the output of said second digital to analog converter generating said velocity control signal.

49. The combination of claim 46 wherein said difference signal developing means and said velocity control signal producing means sequentially produce signals corresponding to different ones of said axes during different periods in a repetitive multiplex scanning cycle.

50. The combination of claim 48 wherein said second multiplying digital to analog converter sequentially produces signals corresponding to different ones of said axes during different periods in a repetitive multiplex scanning cycle.

51. In a programmable manipulator for operation adjacent a reference axis, the combination of:

a manipulator arm movable in a plurality of axes;

memory storage means having stored therein a plurality of digital command signals corresponding to the program step position to which said arm is to be moved, at least one of said plurality of digital command signals including a velocity mode constant representing the reciprocal of the distance to be traversed between successive program steps by a reference point moving along said reference axis;

address means for causing said stored command signals to appear at the output of said memory means in a predetermined sequence;

means common to said plurality of axes for developing position signals corresponding to the actual position of said arm in said plurality of axes and for comparing said digital position signals with said command signals;

means responsive to said stored velocity mode constant and said digital command signals for producing a velocity mode control signal;

means for combining said velocity mode control signal and the output of said comparing and position signal developing means to produce an error loop control signal; and means responsive to said combining means for moving said arm to the position represented by said digital command signals.

52. The combination of claim 51 wherein said plurality of stored digital command signals include a digital representation of positions along said reference axis, said comparing and position signal developing means further comprising means for developing reference axis position signals and for comparing said reference axis position signals with said stored digital reference axis representations, and further comprising means responsive to said reference axis comparing and position signal developing means for controlling said address means.

53. The combination of claim 51 further comprising means for sensing the velocity of each of said plurality of axes and wherein said combining means is responsive to said velocity sensing means and further comprises means for comparing said combined velocity mode control signal and said output of said positional comparing and signal developing means with the velocity of said axes, said moving means being responsive to said velocity comparing means.

54. The combination of claim 22 further comprising means for sensing the velocity of each of said plurality of axes and wherein said combining means is responsive to said velocity sensing means and further comprises means for comparing said combined velocity control signal and the output of said positional comparing means with the velocity of said axes, said moving means being responsive to said velocity comparing means.

55. In a programmable manipulator provided with a manipulator arm which is movable in a plurality of axes, having encoder means for said axes operative to develop position signals corresponding to the actual position of said arm and being arranged adjacent a reference axis to perform a series of operations on a workpiece moving along said reference axis, the combination of:

means for positioning said arm during an initial teaching operation with a stationary workpiece to different positions corresponding to the desired operations of the manipulator relative to the stationary workpiece;

means for calculating signals representing positions of said arm accounting for projected workpiece movement and corresponding to said initial teaching positions relative to said workpiece; and means for storing said calculated arm position signals for use as command signals in controlling movement of said arm in a playback cycle with a moving workpiece.

56. The combination of claim 55 wherein a first series of operations corresponding to different positions of said manipulator arm is performed during said initial teaching operation at a first workpiece location and a second series of operations corresponding to different positions of said manipulator arm is performed during said initial teaching operation at a second workpiece location.

57. In a programmable manipulator the combination of, a manipulator arm which is movable in a plurality of axes, said arm being located adjacent a reference axis to perform a series of operations on a workpiece moving along said reference axis;
- means for positioning said arm at a desired location relative to a stationary workpiece during an initial teaching operation;
- means for calculating the new position in space which said arm should occupy in order to be positioned at said desired location relative to the workpiece assuming a predetermined velocity of said workpiece during a subsequent playback cycle; and
- means for storing digital representations corresponding to said calculated new position for use as a command signal in controlling movement of said arm during said subsequent playback cycle.

58. The combination of claim 57, which includes means responsive to said command signal for moving said arm to said desired location relative to a moving workpiece during a subsequent playback cycle, and means for adjusting said arm moving means for variations in the actual velocity of said moving workpiece from said predetermined velocity during said subsequent playback cycle.

59. The combination of claim 55 further comprising means responsive to said storing means and said calculating means for selectively advancing said workpiece during the initial teaching operation to the approximate position corresponding to the position of the workpiece accounting for projected workpiece movement.

60. The combination of claim 55 further comprising means responsive to said command signals for controlling movement of said arm in correlation with a moving workpiece during a playback cycle.

61. The combination of claim 60 further comprising workpiece encoder means for developing position signals corresponding to workpiece movement along said reference axis, said movement controlling means including means for dividing the resultant difference between successive stored command signals into a number of increments equal to a predetermined number of artificial command signals, means for multiplying each of said increments by a variable integer increasing by one with each successive one of said artificial command signals, and means for combining said series of multiplied increment products with the preceding stored command signal to produce said series of artificial command signals.

62. The combination of claim 61 wherein said means for controlling movement of said arm further comprises means for comparing said position signals corresponding to workpiece movement with said artificial command signals, and said dividing means further comprises counter means responsive to said comparing means and advanced by the coincidence of said artificial command signals and said position signals corresponding to workpiece movement for controlling the generation of successive artificial command signals.

63. The combination of claim 60 further comprising workpiece reference axis encoder means for developing position signals corresponding to workpiece movement along said reference axis, said stored command signals including a workpiece reference axis positional signal corresponding to projected workpiece movement, said movement controlling means including means for detecting a predetermined state of equality between said positional signals of said workpiece encoder means and said artificial workpiece reference axis command signals, and means controlled by said detecting means for generating a predetermined number of artificial command signals for controlling movement of said arm in correlation with said moving workpiece.

64. The combination of claim 63 wherein said artificial command signal generating means further comprises:
- a multiplier responsive to a control input and arranged to multiply the resultant difference between successive command signals by a series of fractions according to said control input, the denominator of each of said fractions being equal to said predetermined number of artificial command signals, the numerator being a variable integer increasing by one with each successive one of said artificial command signals; and
- means for combining said series of products of multiplied difference signals and fractions with the preceding command signal to produce said series of artificial command signals, said control input being generated by said detecting means.

65. The combination of claim 64 wherein said multiplier comprises a plurality of programmable dividers, each of said dividers having a dividend input connected to said resultant difference signal and a divisor input equal to said predetermined number of artificial command signals divided by a different power of two starting with $2^0$ and increasing by one for each successive divider, the number of said dividers being equal to the number of binary digits in said predetermined number of artificial command signals and means for selectively supplying the quotient outputs of said dividers to said combining means in accordance with said control input, said detecting means including a digital counter which is advanced in count upon each detected predetermined state of equality.

66. The combination of claim 60 further comprising workpiece reference axis encoder means for developing position signals corresponding to workpiece movement along said reference axis, said calculating means comprising means responsive to said workpiece reference axis encoder means for calculating projected workpiece position signals for each of said initial teaching positions of said manipulator arm, and means for calculating a velocity mode constant, and means for storing said projected workpiece position signals and said velocity mode constant.

67. The combination of claim 66 wherein said velocity mode constant comprises a digital representation proportional to the reciprocal of the relative time for the workpiece to traverse a predetermined distance at a predetermined velocity along said reference axis.

68. The combination of claim 66 wherein said velocity mode constant comprises a digital representation proportional to the reciprocal of the distance to be traversed between successive command signals by the workpiece along said reference axis.

69. The combination of claim 68 further comprising means responsive to said stored veocity mode constant and the resultant difference between successive command signals for producing a velocity control signal.

70. The combination of claim 69 wherein said velocity control signal producing means further comprises means for adjusting said velocity control signal for changes in the velocity of said workpiece along said reference axis relative to said predetermined velocity.

71. The combination of claim 69 wherein said velocity control signal producing means further comprises means for converting said velocity control constant and said resultant difference signal between successive command signals to an analog velocity control signal.

72. The combination of claim 71, wherein said converting means comprises a multiplying digital to analog converter having said stored velocity mode constant as a digital input and a multiplying reference input that is proportional to said moving workpiece velocity, and a second multiplying digital to analog converter having a signal proportional to said resultant difference signal as a digital input and the analog output of said first digital to analog converter as a multiplying reference input, the output of said second digital to analog converter generating said analog velocity control signal.

73. The combination of claim 72 wherein said second multiplying digital to analog converter sequentially produces signals corresponding to different ones of said axes during different periods in a repetitive multiplex scanning cycle.

74. The combination of claim 66 wherein said movement controlling means comprises means for comparing said encoder position signals for said axes with respective ones of said command signals, and means for combining said velocity mode constant and the output of said comparing means to produce an error loop control signal.

75. The combination of claim 74 which includes means for sensing the velocity of each of said plurality of axes, and means for controlling said combining means in accordance with said sensing means.

76. The combination of claim 66 further comprising means for sensing the velocity of each of said plurality of axes, and means for comparing said sensed velocity and said velocity mode constant to produce an error loop control signal.

77. The combination of claim 55 wherein said calculating means further comprises:
  means for converting said position signals corresponding to different angular positions of said arm in said plurality of axes for successive taught steps to Cartesian coordinates of the free end of said arm;
  means for translating said resulting Cartesian coordinates to account for the projected movement of said workpiece in terms of positional displacement units along said reference axis during the projected elapsed time for said arm to traverse the distance between successive taught positions on said workpiece, and
  means for reconverting said translated Cartesian coordinates into new position signals corresponding to different angular positions of said arm in said plurality of axes.

78. In a programmable manipulator provided with a manipulator arm which is movable in a plurality of axes, having means for developing position signals corresponding to the actual position of said arm in said plurality of axes and arranged adjacent a reference axis to perform a series of operations on a workpiece moving along said reference axis, the combination of:
  means for positioning said arm at different locations relative to a stationary workpiece during an initial teaching operation;
  means for converting said position signals corresponding to different angular positions of said arm in said plurality of axes for successive taught steps into corresponding Cartesian coordinates; and
  means for translating said resulting Cartesian coordinates to account for the projected movement of said workpiece in terms of positional displacement units along said reference axis during the projected elapsed time for said arm to traverse the distance between successive taught positions on said workpiece.

79. In a programmable manipulator provided with a manipulator arm which is movable in a plurality of axes, having means for developing position signals corresponding to the actual position of said arm in said plurality of axes, and arranged adjacent a reference axis to perform a series of operations on a workpiece moving along said reference axis, the combination of:
  means for positioning said arm at different locations relative to a stationary workpiece during an initial teaching operation;
  means for converting said position signals corresponding to different angular positions of said arm in said plurality of axes for successive taught steps into corresponding Cartesian coordinates;
  means for calculating the time interval required for said arm to traverse the distance between successive taught positions when the workpiece is moving at a predetermined velocity; and
  means controlled by said calculating means for translating said resulting Cartesian coordinates to account for movement of said workpiece along said refenece axis during said calculated time interval.

80. In a programmable manipulator provided with a manipulator arm which is movable in a plurality of axes, having means for developing position signals corresponding to the actual position of said arm in said plurality of axes and arranged adjacent a reference axis to perform a series of operations on a workpiece moving along said reference axis, the combination of:
  means for positioning said arm at different locations relative to a stationary workpiece during an initial teaching operation;
  means for converting said position signals corresponding to different angular positions of said arm in said plurality of axes for successive taught steps into corresponding Cartesian coordinates;
  means for calculating the time interval required for said arm to traverse the distance between successive taught locations when said arm is moving at a first predetermined velocity and said workpiece is moving along said reference axis at a second predetermined velocity; and
  means controlled by said calculating means for translating said resulting Cartesian coordinates to account for movement of said workpiece along said reference axis during said calculated time interval.

81. In a programmable manipulator provided with a manipulator arm which is movable in a plurality of axes, having means for developing position signals corresponding to the actual position of said arm in said plurality of axes and arranged adjacent a reference axis to perform a series of operations on a workpiece moving along said reference axis, the combination of:
  means for positioning said arm at different locations relative to a stationary workpiece during an initial teaching operation;
  means for converting said position signals corresponding to different angular positions of said arm in said plurality of axes for successive taught steps into corresponding Cartesian coordinates;
  means for calculating the path of movement which is required for said arm when moving at a first predetermined velocity in order to position said arm at the taught location relative to the workpiece when the workpiece is moving at a second predetermined velocity; and means controlled by said calculating means for translating said resulting Cartesian coordinates to values corresponding to said taught location relative to a moving workpiece.

82. The combination of claim 79 wherein said predetermined velocity of said workpiece is the maximum allowable velocity of said workpiece when said arm is moving at its maximum velocity.

83. The combination of claim 77 wherein said translating means comprises:

means for determining the projected time interval $T_{1-2}$ for the arm to traverse the distance between successive taught points $P_{1s}$ and $P_{2s}$ on the stationary workpiece at a projected arm velocity of S, and means for modifying the Cartesian coordinates of $P_{2s}$ by a quantity which is defined by a first factor equal to the accumulated program position, $\Sigma D_1$, up to program step 1 corresponding to $P_{1s}$ in terms of a number of basic displacement units of workpiece position and the distance $D_{1-2}$ traversed by the workpiece during movement of the arm between $P_{1s}$ and $P_{2s}$ in terms of a number of basic displacement units of workpiece position.

84. The combination of claim 83 wherein said $T_{1-2}$ determining means comprises:

means for defining the positional vector $\Delta S_{1-2}$ representing the distance between taught point $P_{1m1}$ and point $P_{2m2}$, where $P_{1m1}$ is the projected position of $P_{1s}$ at a first program step 1 position $\Sigma D_1$ and $P_{2m2}$ is the projected position of $P_{2s}$ at a second successive program step 2 position $D_2$, first means for defining said vector $S_{1-2}$ by summing the positional vectors $\Delta S_s$ and $\Delta Z_{1-2}$ where $\Delta S_s$ is the positional change between said points $P_{1s}$ and $P_{2s}$ and the positional vector $\Delta Z_{1-2}$ is the distance traversed by the workpiece at the projected velocity $\dot{Z}_L$ and is defined by the product of $\dot{Z}_L$ and $T_{1-2}$, second means for defining said positional vector $\Delta S_{1-2}$ in a second manner by the product of the projected arm velocity $\dot{S}$ and $T_{1-2}$, and means for obtaining $T_{1-2}$ by equating said first and second defined quantities $\Delta S_{1-2}$.

85. The combination of claim 77 wherein said translating means comprises:

means for determining the positional vector $\Delta S_{1-2}$ in Cartesian coordinates defining the distance between a first taught point $P_{1m1}$ which is the projected point of $P_{1s}$ at a first programm step 1 position relative to the workpiece position and a second point $P_{2m2}$ which is the projected position of the workpiece when said arm is moved between teach points $P_{1s}$ and $P_{2s}$ at a projected nominal velocity $\dot{S}$, said positional vector $\Delta S_{1-2}$ calculated by summing the positional vector $\Delta S_s$ defining the vectorial positional change between said $P_{1s}$ and $P_{2s}$ taught point and the positional vector $\Delta Z_{1-2}$ which is the distance traversed by the workpiece at the projected workpiece velocity $\dot{Z}_L$, the term $\Delta Z_{1-2}$ being defined by $\dot{Z}_L$ multiplied by the time $T_{1-2}$ to traverse the distance from points $P_1$ to $P_2$ with the workpiece moving, said predetermined quantity $T_{1-2}$ defining the term $\Delta S_{1-2}$, and means for modifying the Cartesian coordinates of $P_{2s}$ by a factor of $\Sigma D_2$ which is equal to the sum of the factors $\Sigma D_1$ and $D_{1-2}$, where $\Sigma D_1$ is the accumulated projected position of the workpiece from a reference point and $D_{1-2}$ is the distance defined by the product of $T_{1-2}$ and $\dot{Z}_L$.

86. The method of programming a manipulator to perform a series of operations on a workpiece while the workpiece is moving along a predetermined path, the manipulator having an arm which is movable in a plurality of axes and encoder means for said axes operative to develop position signals corresponding to the actual position of said arm, the method comprising the steps of:

moving said arm to different positions relative to a stationary workpiece during an initial teaching operation, said positions corresponding to desired operations of the manipulator relative to the stationary workpiece;

calculating signals representing manipulator arm positions different from the positions to which said arm is moved during said teaching operation and corresponding to positions of said arm accounting for projected workpiece movement; and storing said calculated signals for use in controlling movement of said arm during playback with a moving workpiece.

87. The method of claim 86 wherein said initial teaching operation step comprises the steps of moving said arm through a first series of operations corresponding to different positions of said manipulator arm at a first workpiece location and moving said arm through a second series of operations corresponding to different positions of said manipulator arm at a second workpiece location.

88. The method of claim 87 wherein said first and second series of operations correspond to the same pattern of operations relative to said workpiece.

89. The method of claim 86 further comprising the step of selectively advancing the workpiece during the initial teaching operation to the approximate position corresponding to the position of the workpiece accounting for projected workpiece movement.

90. The combination of claim 57, which includes means responsive to said command signal for moving said arm to said desired location relative to a workpiece which is moving at a velocity which is different from said assumed velocity during a subsequent playback cycle.

91. The combination of claim 57, which includes means for positioning a workpiece at two different locations relative to said manipulator during said initial teaching operation, means for positioning said arm at a series of desired locations relative to said workpiece when said workpiece is at each of said two different locations, said two series of desired locations collectively comprising a desired path of movement of said arm relative to a moving workpiece during a subsequent playback cycle.

92. The combination of claim 91 wherein said calculating means calculates new positions of said arm corresponding to said two series of desired locations while correcting for the positioning of said workpiece at said two different locations during said initial teaching operation.

* * * * *